US012629932B2

(12) United States Patent
Muraoka

(10) Patent No.: US 12,629,932 B2
(45) Date of Patent: May 19, 2026

(54) PRINTING TOOL, PRINTING APPARATUS, AND PRINTING METHOD

(71) Applicant: Shuhou Co., Ltd., Fukui (JP)

(72) Inventor: Kouji Muraoka, Sabae (JP)

(73) Assignee: SHUHOU CO., LTD., Fukui (JP)

( * ) Notice: Subject to any disclaimer, the term of this patent is extended or adjusted under 35 U.S.C. 154(b) by 17 days.

(21) Appl. No.: 18/556,762

(22) PCT Filed: Jul. 21, 2022

(86) PCT No.: PCT/JP2022/028386

§ 371 (c)(1),
(2) Date: Oct. 23, 2023

(87) PCT Pub. No.: WO2024/018602

PCT Pub. Date: Jan. 25, 2024

(65) Prior Publication Data

US 2025/0083433 A1 Mar. 13, 2025

(51) Int. Cl.
*B41F 17/00* (2006.01)
*B41M 1/40* (2006.01)
(Continued)

(52) U.S. Cl.
CPC ............ *B41F 17/001* (2013.01); *B41F 17/00* (2013.01); *B41M 1/40* (2013.01); *B41F 17/18* (2013.01); *B41F 17/34* (2013.01)

(58) Field of Classification Search
CPC ........ B41F 17/00; B41F 17/001; B41F 17/18; B41F 17/34; B41M 1/40
See application file for complete search history.

(56) References Cited

U.S. PATENT DOCUMENTS 6,405,476 B1 * 6/2002 Wiseman .............. B41F 17/001 43/42.53
2011/0315035 A1 12/2011 Muraoka
(Continued)

FOREIGN PATENT DOCUMENTS

CN 107848291 A 3/2018
JP S6436450 A 2/1989
(Continued)

OTHER PUBLICATIONS

Foreign Reference.*
(Continued)

*Primary Examiner* — Jill E Culler
(74) *Attorney, Agent, or Firm* — BUCHANAN, INGERSOLL & ROONEY PC

(57) ABSTRACT

A printing tool of the present disclosure is a printing tool disposed at least at a portion of a periphery of an item to be printed in performing printing in which a printing pad is pushed against the item to be printed by being linearly moved in a first direction toward a printing stage to transfer an ink image transferred to a printing surface of the printing pad to the item to be printed, wherein the printing tool includes an inner edge disposed side by side with the item to be printed in a second direction orthogonal to the first direction, and facing, in the second direction, a peripheral edge portion of the item to be printed that is a portion outside a printing range of the item to be printed.

3 Claims, 15 Drawing Sheets

(51) Int. Cl.
*B41F 17/18* (2006.01)
*B41F 17/34* (2006.01)

(56) References Cited

U.S. PATENT DOCUMENTS

| | | | | |
|---|---|---|---|---|
| 2015/0202861 A1* | 7/2015 | Baggen | A43B 3/0078 | 101/127 |
| 2021/0362488 A1 | 11/2021 | Cheng | | |

FOREIGN PATENT DOCUMENTS

| | | | | |
|---|---|---|---|---|
| JP | H0531879 | A | | 2/1993 |
| JP | H0847585 | A | | 2/1996 |
| JP | 2008055253 | A | | 3/2008 |
| JP | 2011000736 | A | | 1/2011 |
| JP | 5295005 | B2 | | 6/2013 |
| JP | 2021000776 | A | | 1/2021 |
| JP | 2021-045950 | A | | 3/2021 |
| KR | 101446693 | B1 | * | 10/2014 |
| KR | 10-2203327 | B1 | | 1/2021 |

OTHER PUBLICATIONS

International Search Report (PCT/ISA/210) and Written Opinion (PCT/ISA/237) mailed on Oct. 4, 2022, by the Japan Patent Office as the International Searching Authority for International Application No. PCT/JP2022/028386. (9 pages).

Office Action (Notice of Reasons for Refusal) issued on Aug. 5, 2025, in corresponding Japanese Patent Application No. 2024-534872 and machine English translation of the Office Action. (8 pages).

Office Action (Request for the Submission of an Opinion) issued on Oct. 1, 2025, in corresponding Korean Patent Application No. 10-2023-7037820 and machine English translation of the Office Action. (16 pages).

Office Action/Search Report (The First Office Action) issued on Feb. 4, 2026, in corresponding Chinese Patent Application No. 202280033418.5 and English translation of the Office Action/Search Report. (13 pages).

Extended European Search Report issued on Mar. 2, 2026, in corresponding European Patent Application No. 22940495.9. (15 pages).

* cited by examiner

PRINTING TOOL, PRINTING APPARATUS, AND PRINTING METHOD

TECHNICAL FIELD

The present disclosure relates to printing that is performed by causing a printing pad to linearly move to push a printing surface against a surface to be printed, and particularly relates to the structure of a printing tool and to a printing apparatus and a printing method that use the printing tool.

BACKGROUND ART

Conventionally, in offset printing, the printing surface of a printing pad is pushed against a printing original plate to transfer, to the printing pad, ink placed on the printing original plate corresponding to a print pattern. Then, the printing surface of the printing pad to which the ink is transferred is pushed against a surface to be printed to transfer the ink to the surface to be printed, so that the print pattern is printed on the surface to be printed.

In the disclosure disclosed in Patent Literature 1, a printing pad (printing blanket) is pushed against a printing original plate. Ink in a fine dot pattern is placed on the printing original plate. The ink held on the printing original plate is transferred to the printing pad that is pushed against the printing original plate. When the printing pad is pushed against the printing original plate, the ink is transferred to the printing pad.

Then, the ink is transferred to an item to be printed from the printing pad. The printing pad disclosed in Patent Literature 1 is configured such that the ink placed on the printing original plate is transferred to a printing surface, and the ink transferred to the printing surface is transferred to the item to be printed. When the apex (lowermost portion) of the printing pad is brought into contact with a board on which the item to be printed is placed, the printing pad is deformed. The printing surface is on the side surface of the printing pad that is away from the apex of the printing pad, and when the printing pad is deformed, the printing surface is brought into contact with the side surface of the item to be printed. With such a configuration, even in the case where the surface to be printed of an item to be printed is inclined relative to the direction along which the printing pad is pushed against the surface to be printed, the printing surface of the printing pad is pushed against the surface to be printed at an angle close to the direction of the normal of the surface to be printed. Accordingly, influence of deformation of the printing pad and influence of slippage between the printing surface and the surface to be printed are suppressed and hence, it is possible to suppress a reduction in accuracy of the image transferred to the surface to be printed.

CITATION LIST

Patent Literature

Patent Literature 1: Japanese Patent No. 5295005

SUMMARY OF INVENTION

Technical Problem

However, in the case of performing printing by pushing the printing pad disclosed in Patent Literature 1 against the surface to be printed, when an attempt is made to transfer a print image to the side surface of the item to be printed, it is necessary to perform printing by pushing the printing pad through a large depth. Therefore, there is a problem that slippage occurs between the surface of the printing pad and the surface to be printed, thus causing deformation of ink, leading to a reduction in accuracy of the print image and damage to the pad. In performing printing, it is necessary to perform printing by dividing the entire surface to be printed into a plurality of portions. Therefore, there is a problem that, in performing printing on the entire item to be printed, it is necessary to repeat a step of pushing the printing surface against the printing original plate and a step of pushing the printing surface against the surface to be printed a plurality of times.

Further, in the case of performing printing on a wide range of an item to be printed, for example, there may be cases where printing is performed by pushing the printing pad against a portion of the item to be printed that has a corner shape in cross section. In this case, the surface of the printing pad that comes into contact with the corner portion of the item to be printed receives a high surface pressure. Accordingly, there is a problem that the surface of the printing pad repeatedly receives a high load, thus being damaged.

The present disclosure has been made to solve the above-mentioned problems, and it is an object of the present disclosure to provide a printing tool, a printing apparatus, and a printing method that can suppress slip deformation of ink and image distortion on a surface to be printed having a complicated shape and that can suppress damage to a printing pad.

Solution to Problem

A printing tool of an embodiment of the present disclosure is a printing tool disposed at least at a portion of a periphery of an item to be printed in performing printing in which a printing pad is pushed against the item to be printed by being linearly moved in a first direction toward a printing stage to transfer an ink image transferred to a printing surface of the printing pad to the item to be printed, wherein the printing tool includes an inner edge disposed side by side with the item to be printed in a second direction orthogonal to the first direction, and facing, in the second direction, a peripheral edge portion of the item to be printed that is a portion outside a printing range of the item to be printed.

A printing apparatus of another embodiment of the present disclosure includes: the above-mentioned printing tool; the printing stage to which the printing tool is fixed; and the printing pad configured to be pushed against the printing tool and the item to be printed.

A printing method of still another embodiment of the present disclosure is a printing method in which a printing pad is pushed against an item to be printed by being linearly moved in a first direction toward a printing stage to transfer an ink image transferred to a printing surface of the printing pad to the item to be printed, the printing method including: placing a printing tool on the printing stage, the printing tool including an inner edge located in such a way as to face a peripheral edge portion of the item to be printed, and a pad receiving surface extending outward from the inner edge; and pushing the printing pad against the item to be printed and the printing tool, the printing pad being pushed against the printing tool until the printing pad is brought into contact with the pad receiving surface.

Advantageous Effects of Invention

According to the embodiment of the present disclosure, the printing tool is disposed side by side with the peripheral edge portion of the item to be printed to suppress deformation of the printing pad and to apply a load from the printing pad to the respective portions of the item to be printed as uniformly as possible. Accordingly, it is possible to perform printing with high accuracy by suppressing image distortion caused by slippage between the item to be printed and the printing surface, and it is possible to suppress local concentration of a load on the surface of the printing pad when the printing pad is pushed against the item to be printed and hence, damage to the printing pad can be suppressed.

DESCRIPTION OF EMBODIMENTS

Embodiment 1

Figure 1:
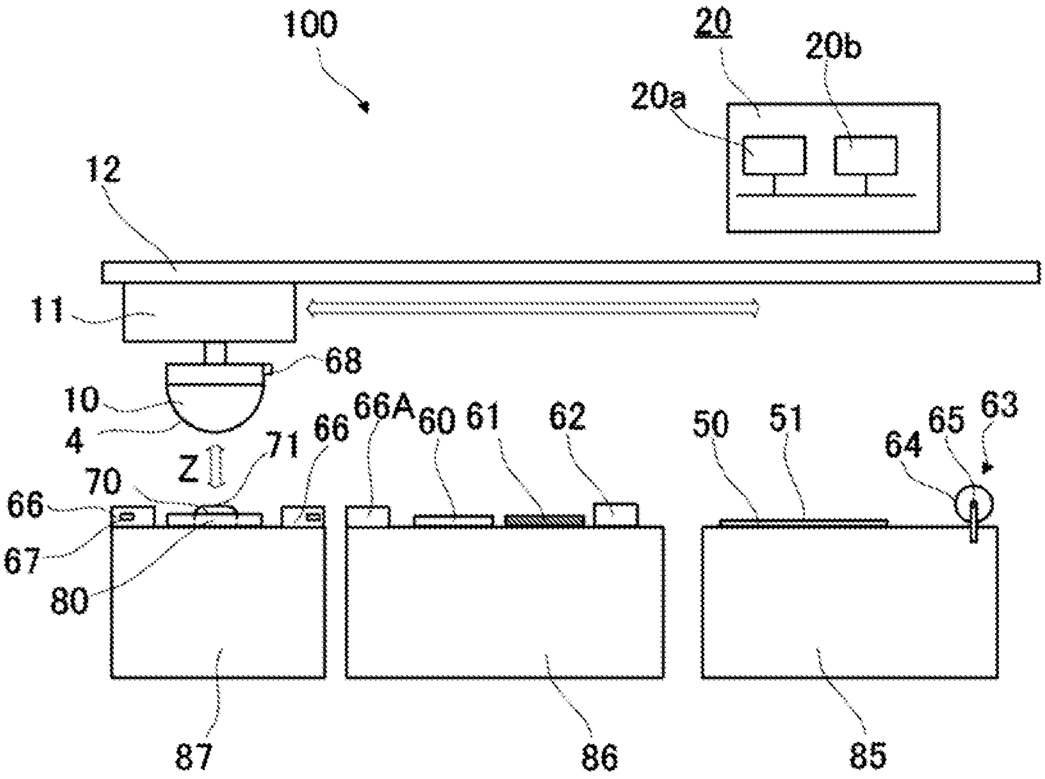
FIG. 1 is a side view showing one example of a printing apparatus 100 according to Embodiment 1.

Hereinafter, a printing tool, a printing apparatus, and a method for producing an item to be printed according to the present disclosure will be described with reference to drawings. The present disclosure is not limited by Embodiment described hereinafter. In the respective drawings, identical components are given the same reference symbols, and the description of such components is partially omitted. The respective drawings are schematically drawn, and the present disclosure is not limited to the shape shown in the drawings. Further, in the DESCRIPTION, an elastic body or a body having elasticity is not limited to a body having a linear relationship between the load applied to the body and the amount of deformation generated by the load. The elastic body or the body having elasticity includes a body where the load applied to the body and the amount of deformation generated by the load have a non-linear relationship, and the shape of the body returns to the original shape immediately or after a predetermined time period when the applied load is removed.

<Printing Apparatus 100>

FIG. 1 is a side view showing one example of a printing apparatus 100 according to Embodiment 1. The printing apparatus 100 is an apparatus that transfers ink placed on a printing original plate 50 to a printing surface 4 of a printing pad 10, and then transfers the ink, transferred to the printing surface 4, to a surface to be printed 71 of an item to be printed 70. A surface included in a printing range A is collectively referred to as "surface to be printed 71", and the surface to be printed 71 may have an unevenness shape. The printing apparatus 100 is an apparatus that, when the surface to be printed 71 has a surface inclined relative to the direction along which the printing pad 10 is pushed, can also perform printing on the inclined surface. The direction along which the printing pad 10 is pushed is a Z direction shown in FIG. 1 or the like, and may be referred to as "first direction".

The printing apparatus 100 includes the printing pad 10 that can move linearly in the vertical direction. The printing pad 10 is a pad that is vertically moved by a vertically moving device 11 included in the printing apparatus 100, and that pushes the printing surface 4 against the surface to be printed 71 of the item to be printed 70 to transfer ink, transferred to the printing surface 4, to the surface to be printed 71. The printing apparatus 100 also includes a horizontally moving device 12. The horizontally moving device 12 moves the printing pad 10 and the vertically moving device 11 in the horizontal direction. The printing pad 10 is, by the horizontally moving device 12, moved to an area above the item to be printed 70, a cleaning device 60, an activation device 61, an air blowing device 62, or the printing original plate 50. The printing surface 4 of the printing pad 10 is vertically moved by the vertically moving device 11, thus being pushed against the item to be printed 70, the cleaning device 60, the activation device 61, or the printing original plate 50.

In FIG. 1, the printing apparatus 100 includes, from the left, a printing stage 87, a surface treatment stage 86, and a printing original plate stage 85. The item to be printed 70 is placed on the printing stage 87. The cleaning device 60, the activation device 61, and the air blowing device 62 are provided to the surface treatment stage 86. The printing original plate 50 is placed on the printing original plate stage 85. However, in the printing apparatus 100, these stages may be freely arranged, and the arrangement may be suitably changed according to the convenience of the operator or to the location where the printing apparatus 100 is installed, for example. Further, each of the respective devices of the printing apparatus 100 is installed on the printing apparatus 100 as necessary, so that there may be a case where the device is not installed.

As shown in FIG. 1, blowers 66 are installed on the printing stage 87. The blower 66 is a blower that sends air toward the printing surface 4 of the printing pad 10. The printing apparatus 100 may be configured to include either one of the blowers 66 or the air blowing devices 62, and to cause either one of the blowers 66 or the air blowing devices 62 to serve as the blower 66 and the air blowing device 62. The blower 66 may be installed on the surface treatment stage 86 as a blower 66A. In this case, the blower 66 is omitted.

<Printing Pad 10>

Figure 2:
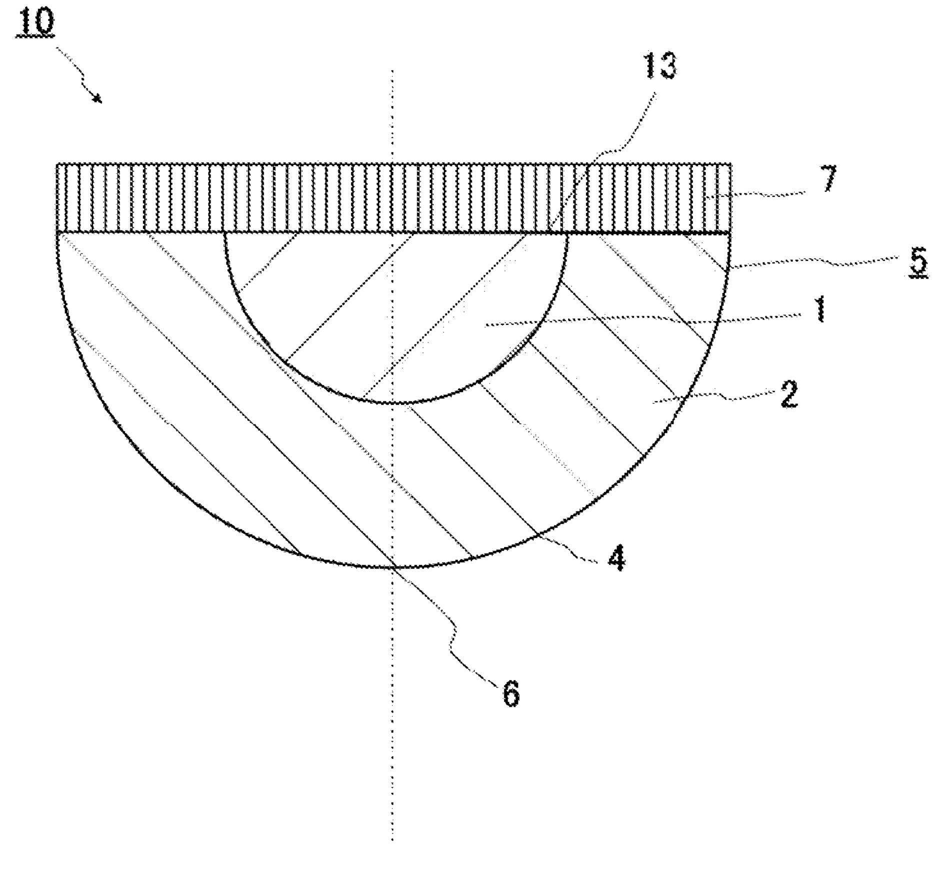
FIG. 2 is a cross-sectional view showing one example of a printing pad 10 included in the printing apparatus 100 according to Embodiment 1.

FIG. 2 is a cross-sectional view showing one example of the printing pad 10 included in the printing apparatus 100 according to Embodiment 1. FIG. 2 is a cross-sectional view of the printing pad 10 shown in FIG. 1, and shows a cross section that passes through an apex 6 of the printing pad 10, and that is perpendicular to a support part 7 to which a base 5 is fixed. The printing pad 10 has a substantially hemispherical shape, for example. The shape of the printing pad 10 is not limited to such a shape, and may be suitably changed to, for example, a cannonball shape, a shape having a curved surface obtained by rotating a parabola about the axis of symmetry of the parabola, a shape of a portion of an ellipsoid obtained by cutting the ellipsoid or other shape, a shape obtained by contiguously extending the cross section of the cannonball shape or a semicircular shape along a straight line, or other shapes corresponding to the specifications or other factor of the item to be printed 70. The printing pad 10 has a top portion that comes into contact with the item to be printed 70 or the printing original plate 50 first. The top portion is in the form of a point or a line. With such a configuration, when the printing pad 10 is pushed against the item to be printed 70 or the printing original plate 50, it is possible to suppress a situation in which air is caught between the printing surface 4 and the item to be printed 70 or the printing original plate 50. By avoiding air being caught, it is possible to suppress the generation of a void of ink 40 in transferring the ink 40 from the printing original plate 50 to the printing pad 10 and the generation of a void in a print image applied to the item to be printed 70. In Embodiment 1, of the surface of the printing pad 10, a predetermined range centered about the apex 6 forms the printing surface 4 to which ink 40 is moved from the printing original plate 50 to transfer the ink 40 to the item to be printed 70. However, the printing surface 4 may be set to include no apex 6. That is, the apex 6 may be pushed against the surface of a printing tool 80 or the printing stage 87 without being brought into contact with the surface to be printed 71. With such a configuration, it is possible to perform printing without using a top portion where air is likely to be caught.

As shown in FIG. 2, the base 5 of the printing pad 10 includes an inner layer 1 and an outer layer 2 that is disposed to cover the surface of the inner layer 1. Each of the inner layer 1 and the outer layer 2 is fixed to the support part 7. The printing pad 10 is not limited to have a two-layered structure, and may have a multilayer structure.

The outer layer 2 is formed by molding silicone rubber, for example. The outer layer 2 has elasticity (flexibility), and silicone oil is mixed to facilitate deformation. In Embodiment 1, the outer layer 2 has a substantially hemispherical shape. However, the shape of the outer layer 2 may be suitably changed corresponding to the specifications or other factor of the item to be printed 70. When the printing pad 10 is pushed against the printing original plate 50, the outer layer 2 is deformed to cause ink 40 placed on a placement surface 51 of the printing original plate 50 (see FIG. 3) to move to the printing surface 4. The ink 40 placed on the placement surface 51 of the printing original plate 50 is arranged corresponding to an image to be printed on the item to be printed 70, thus forming a print pattern.

Figure 3:
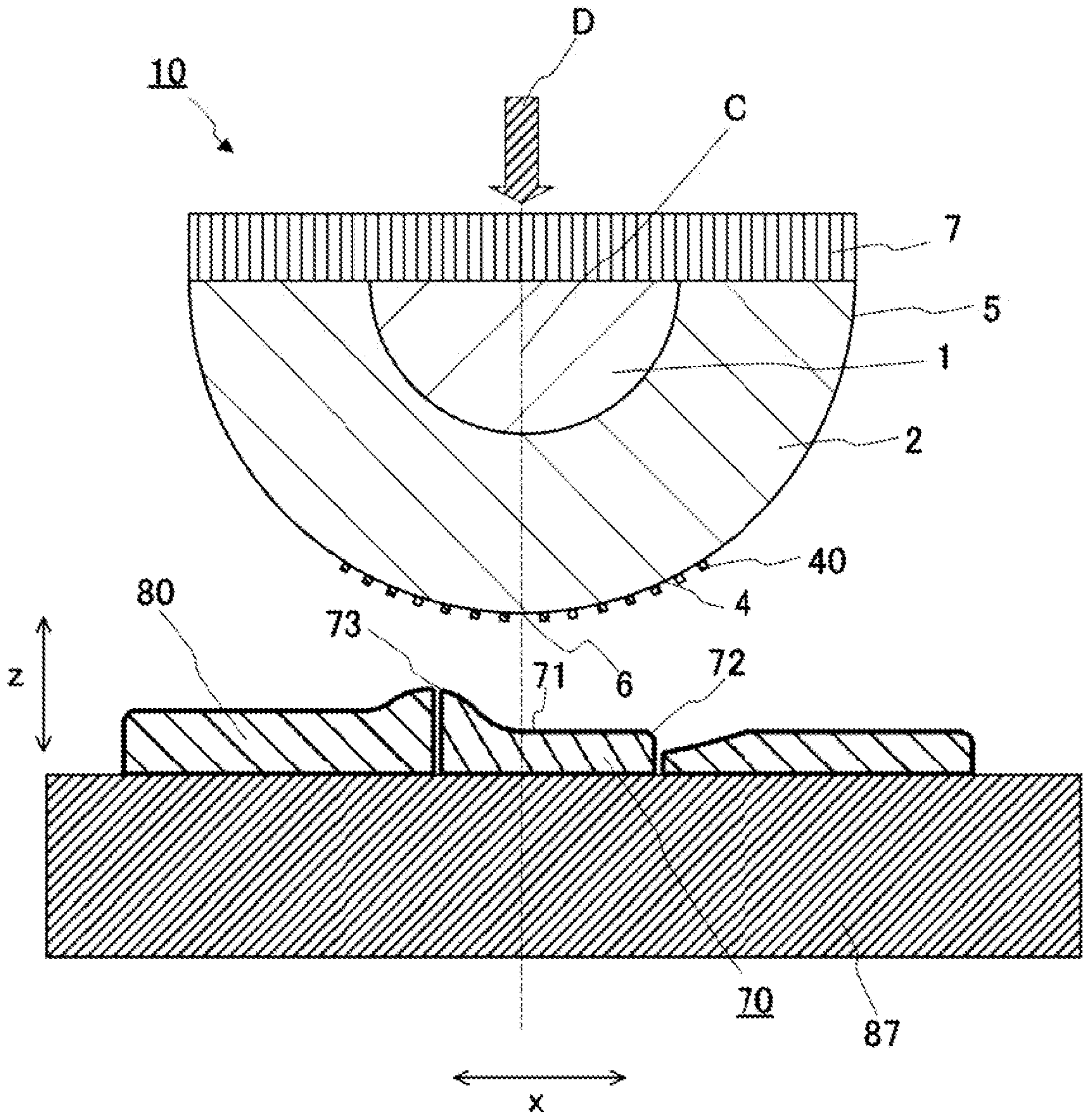
FIG. 3 is a cross-sectional view of the printing pad 10 included in the printing apparatus 100 according to Embodiment 1 when the printing pad 10 is pushed against an item to be printed 70.

FIG. 3 is a cross-sectional view of the printing pad 10 included in the printing apparatus 100 according to Embodiment 1 when the printing pad 10 is pushed against the item to be printed 70. The printing pad 10 is moved along the Z direction, so that the surface of the outer layer 2 is pushed against the item to be printed 70, and the printing surface 4 is deformed to conform to the surface to be printed 71 and the printing tool 80. In such a case, for example, the material of the outer layer 2, forming a portion close to the printing surface 4, is set to a material having Asker C hardness in a range of 0 to 20 points. The inner layer 1 disposed inside the outer layer 2 may be made of silicone rubber having higher hardness than the outer layer 2, for example, or may be made of a material that is less likely to be deformed, such as plastic foam. For example, the inner layer 1 may be made of foamed plastic, such as ABS foam or polystyrene foam. That is, the inner layer 1 may have a structure having cavities in the inside of the inner layer 1. The cavities are fine air bubbles, for example. The inner layer 1 may be a part that has cavities in the inside and that has strength and rigidity of a level that allows the inner layer 1 to maintain the shape when the printing pad 10 is pushed against the item to be printed 70.

The inner layer 1 is disposed at a position where the inner layer 1 can apply a force for pushing the printing surface 4 against the surface to be printed 71 during printing, and the inner layer 1 is disposed inside the outer layer 2 as viewed from the printing surface 4 side. The support part 7 is a portion that is connected to the vertically moving device 11, and that transfers a force from the vertically moving device 11 to the printing pad 10.

To allow the printing pad 10 to be deformed to conform to the surface to be printed 71 and the surface of the printing tool 80, it is desirable to set hardness of the printing pad 10 to a low level (a soft level). Therefore, it is necessary to set hardness of the portion of the printing pad 10 including the printing surface 4, which is pushed against the item to be printed 70, that is, hardness of the outer layer 2, to a lower level than the inner layer 1. By forming the outer layer 2 as described above, the printing surface 4 can easily conform to the surface to be printed 71 due to a soft layer, and the shape of the entire printing pad 10 can be easily held by the inner layer 1 that is hardly deformed even when the printing pad 10 is pushed against the item to be printed 70. In addition to the above, the outer layer 2 that is directly pushed against the surface to be printed 71 has an advantage that the outer layer 2 can be easily deformed to conform to a surface to be printed 77 that is a curved surface, and a surface to be printed 76 that is inclined relative to the direction along which the printing pad 10 moves. However, hardnesses of the respective portions of the base 5 are not limited to the above-mentioned hardnesses.

It is preferable to form the printing pad 10 such that the printing surface 4 at least ensures an area 1.5 or more times greater than the area of the surface to be printed 71. With such a configuration, when the printing pad 10 is pushed against the item to be printed 70, the printing pad 10 has a reduced deformation rate (the ratio of the amount of deformation to the size of the printing pad 10) and hence, it is possible to suppress slippage of the printing surface 4 against the surface to be printed. Also by reducing hardness of the printing pad 10, it is possible to suppress slippage of the printing surface 4 against the surface to be printed. In Embodiment 1, the printing surface 4 is on the surface of the outer layer 2. The surface of the inner layer 1 (the surface that faces the printing surface 4) may have a shape similar to the shape of the surface of the outer layer 2, or may have a shape that is elongated in the direction along which the printing pad 10 is pushed compared with the shape of the surface of the outer layer 2, for example. It is preferable that the volume of the inner layer 1 including cavities (air bubbles in the inner layer 1) in the inner layer 1 be set to 30% or less of the volume of the entire base 5.

<Cleaning Device 60>

As shown in FIG. 1, the surface treatment stage 86 is disposed adjacent to the printing stage 87 of the printing apparatus 100. The cleaning device 60 is installed on the surface treatment stage 86. The cleaning device 60 includes a piece of paper or an adhesive tape, for example. The printing surface 4 of the printing pad 10 is pushed against the surface of the piece of paper or the adhesive tape, so that the ink 40, stains, dust and other substance remaining after printing are removed.

<Activation Device 61>

The activation device 61 includes a storage tank that stores liquid, and an absorbing unit that absorbs and holds the liquid. When the printing surface 4 of the printing pad 10 is pushed against the surface of the absorbing unit, the liquid held by the absorbing unit thereby adheres to the printing surface 4 of the printing pad 10. The printing pad 10 is a pad where water or solvent is caused to adhere to or permeate into the base 5 to facilitate transfer of the ink 40 placed on the printing original plate 50 to the printing surface 4. A liquid is suitably selected on the basis of its properties having compatibility with the ink 40, and the liquid has properties of softening a hard ink 40. The ink 40 is formed by adding a pigment or dye to water or solvent. A liquid used for the activation device 61 is, for example, a mixture of a synthetic resin, such as an acrylic resin or a urethane resin, and water, thinner, xylene, toluene, or other substance. It is preferable to select a mixture having a high affinity for a solvent contained in the ink 40. However, a liquid used for the activation device 61 is not limited to the above.

The absorbing unit of the activation device 61 may be formed by laminating thin absorbing materials each having a sheet shape, for example. The absorbing material is a piece of paper, for example. However, the absorbing material is not limited to only a piece of paper. As long as the absorbing material absorbs liquid, the absorbing material may be any of other materials, such as a cloth and a resin. For example, the absorbing unit may be a unit obtained by laminating pieces of paper on a sponge-like resin. There may be a case where stains, such as the ink 40 remaining on the printing surface 4 of the printing pad 10, adhere to the surface of the absorbing unit, against which the printing surface 4 of the printing pad 10 is pushed, or a case where a piece of paper forming the absorbing unit is torn as the surface of the absorbing unit is scratched. For this reason, the absorbing unit is formed such that the laminated pieces of paper can be removed one by one by peeling off and removing the piece of paper positioned in the uppermost layer of the absorbing unit from the uppermost layer of the absorbing unit, or an upper layer portion can be mechanically replaced. However, a method for replacing a piece of paper positioned in the uppermost layer is not limited to the above. The absorbing unit is formed such that a piece of paper or other material forming the uppermost layer can be removed or replaced and hence, the surface of the absorbing unit is always maintained clean, and liquid permeates through the surface of the absorbing unit. Therefore, pushing the printing surface 4 of the printing pad 10 against the surface of the absorbing unit can activate a printing surface. The absorbing unit of the activation device 61 is not limited to a laminated structure, and may be formed by a single part.

<Air Blowing Device 62>

The air blowing device 62 is a device that adjusts the amount of water or solvent caused to adhere to the printing surface 4 of the printing pad 10 by the activation device 61 to an appropriate amount. The air blowing device 62 removes excess water or solvent from the printing surface 4 by blowing air toward the printing surface 4 before ink is transferred to the printing surface 4 and after the printing surface 4 is pushed against the activation device 61. The type of the air blowing device 62, the number of air blowing devices 62, and the direction along which air is blown are not limited. Further, as long as the amount of liquid caused to adhere to the printing surface 4 by the activation device 61 can be controlled to an appropriate amount, the air blowing device 62 may be omitted.

<Printing Original Plate 50>

The printing original plate 50 is a plate that is placed on the printing original plate stage 85. When the ink 40 is placed on the placement surface 51, and the printing surface 4 of the printing pad 10 is pushed against the placement surface 51, the ink 40 is transferred to the printing surface 4.

The printing original plate 50 is an intaglio plate, for example. Alternatively, the printing apparatus 100 according to Embodiment 1 performs intaglio printing or relief printing, for example. Ink may be placed on the printing original plate 50 by performing ink jet printing. That is, any method may be adopted to arrange ink 40 on the printing original plate 50.

<Ink Placement Device 63>

As shown in FIG. 1, an ink placement device 63 includes an ink holding unit 64 that is a roller having a surface to which a material that holds ink is provided. The ink holding unit 64 is configured to rotate about a rotary shaft 65. The ink placement device 63 causes the ink holding unit 64 to rotate and move on the placement surface 51 of the printing original plate 50 with the ink holding unit 64 being in contact with the placement surface 51 to place the ink 40 in the ink-philic region on the placement surface 51. The configuration of the ink placement device 63 is not limited to a configuration that includes the roller shown in FIG. 1. As long as a configuration allows the ink holding unit 64 to come into contact with the placement surface 51 of the printing original plate 50, the ink placement device 63 may be of a type where the ink holding unit 64 moves vertically relative to the placement surface 51, for example.

The printing original plate 50 has the ink-phobic region and the ink-philic region, and the ink-phobic region repels ink. Therefore, even when the ink-philic region has fine portions, the ink placement device 63 can place ink in the ink-philic region. Further, the ink-phobic region repels excess ink and hence, it is not always necessary for the ink placement device 63 to be provided with a doctor blade that removes excess ink after ink is placed.

In printing a color image on the surface of the item to be printed 70, there may be a case where a plurality of single color printing original plates 50 are used. In such a case, the printing apparatus 100 may include a plurality of ink placement devices 63. Alternatively, printing may be performed on one item to be printed 70 by the plurality of printing apparatuses 100. In such a case, the plurality of printing apparatuses 100 correspond to the plurality of single color printing original plates 50. In Embodiment 1, the description has been made for the ink placement device 63 in performing intaglio printing. However, ink 40 may be arranged on the printing original plate 50 by performing relief printing or ink jet printing. The ink placement device 63 may be suitably changed according to a printing method.

<Blower 66>

As shown in FIG. 1, the printing apparatus 100 includes the blowers 66 configured to send air to the printing surface 4 in a state where the ink 40 is transferred to the printing surface 4 of the printing pad 10. In Embodiment 1, the blowers 66 are disposed around an area where the item to be printed 70 is placed on the printing stage 87. Each blower 66 blows air toward the printing surface 4 before the printing surface 4 is pushed against the surface to be printed 71 with the ink 40 adhering to the printing surface 4. The blower 66 blows air toward the printing surface 4 to evaporate liquid caused to adhere to the printing surface 4 by the activation device 61 and liquid, such as solvent, permeating the ink 40. With such an operation, an affinity between the ink 40 and the printing surface 4 is reduced. Further, the viscosity of the ink 40 is increased. That is, by sending air with the blowers 66, the ink 40 is cured.

It is preferable that the blower 66 be installed at a plurality of portions to cause air to impinge on the printing surface 4. The blower 66 may include a heater in the inside to adjust the temperature of air to be sent to the printing surface 4. The temperature of air to be sent to the printing surface 4 may be adjusted by detecting the temperature of air to be sent to the printing surface 4 with a temperature sensor 68 (see FIG. 13) and by adjusting the output from the heater. Further, a configuration may be adopted in which the temperature sensor 68 detects the temperature of surroundings in the room where the printing apparatus 100 is installed, and output from the heater is adjusted according to the temperature of the room. For example, a cylindrical housing of the blower 66 has a blowing port at one end of the housing, and has an inflow port at the other end of the housing, a fan and a heater 67 being installed in the housing at a portion close to the other end of the housing to take air into the housing.

<Printing Tool 80>

Figure 4:
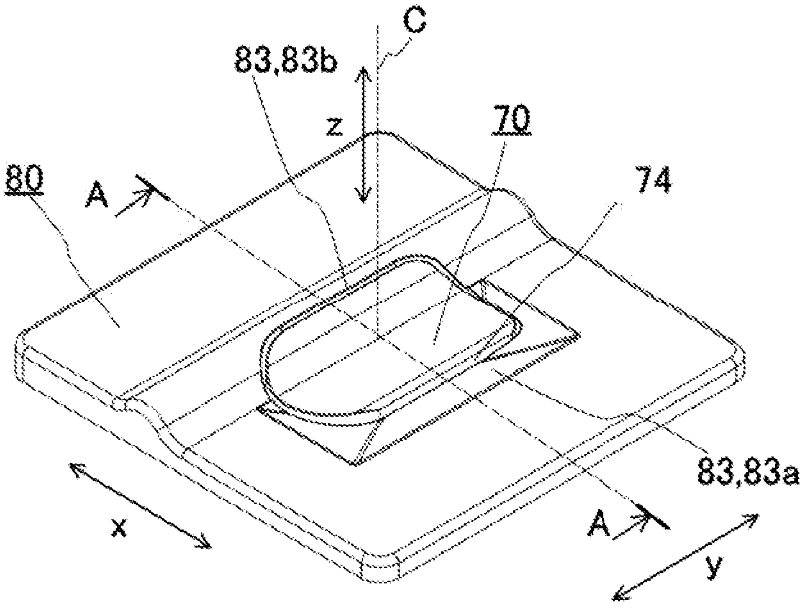
FIG. 4 is a perspective view of one example of the item to be printed 70 and a printing tool 80 according to Embodiment 1.
Figure 5:
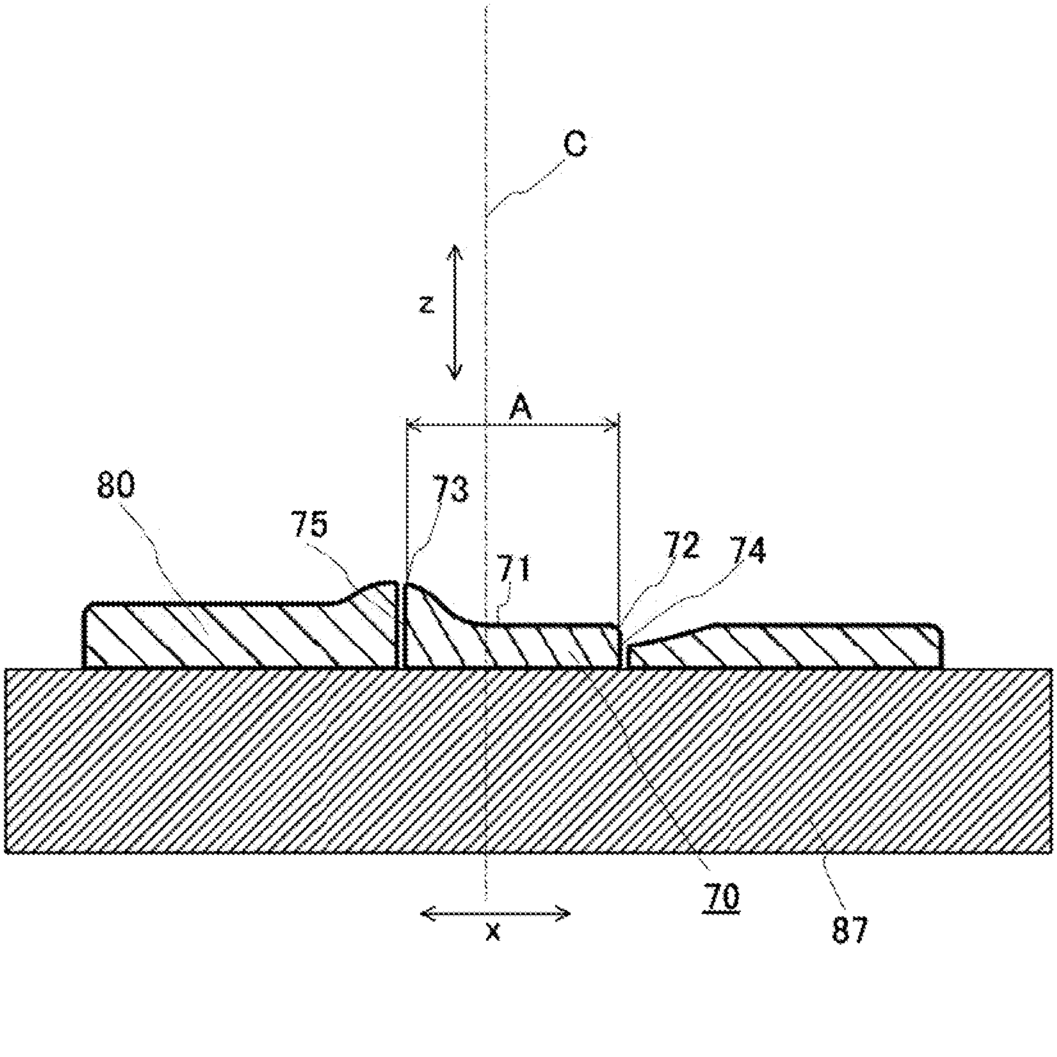
FIG. 5 is a cross-sectional view taken along A-A in FIG. 4.

FIG. 4 is a perspective view of one example of the item to be printed 70 and the printing tool 80 according to Embodiment 1. FIG. 5 is a cross-sectional view taken along A-A in FIG. 4. The item to be printed 70 and the printing tool 80 are placed on the printing stage 87, and the printing tool 80 is disposed in such a way as to enclose the periphery of the item to be printed 70. However, the printing tool 80 is not limited to a printing tool that encloses the periphery of the item to be printed 70 over the entire circumference, and also includes a printing tool that is partially disposed on the periphery of the item to be printed 70. The cross-sectional structure shown in FIG. 4 or the like is merely one example of the cross-sectional structure of at least a portion of the printing tool 80, and it is not always necessary for the entire printing tool 80 to have a similar cross-sectional structure. The shape of the printing tool 80 is set corresponding to the shape of the item to be printed 70 and the printing range A. In the cross section shown in FIG. 5, the printing range A is a range from the left end portion to the right end portion of the item to be printed 70 in the X direction perpendicular to the Z direction, the left end portion being a portion that protrudes upward in the Z direction, the right end portion being a portion where a corner is rounded into an arc shape. The left end portion of the printing range A is a point at which the R shape of the distal end of a protruding portion starts (the end of the R shape on an imaginary line C side). The right end portion of the printing range A is a point on a rounded corner (a point located at a position closer to the imaginary line C than the point at which the rounded corner intersects with the flat surface of the item to be printed 70 that extends along the Z direction). The X direction may be referred to as "second direction".

Figure 6:
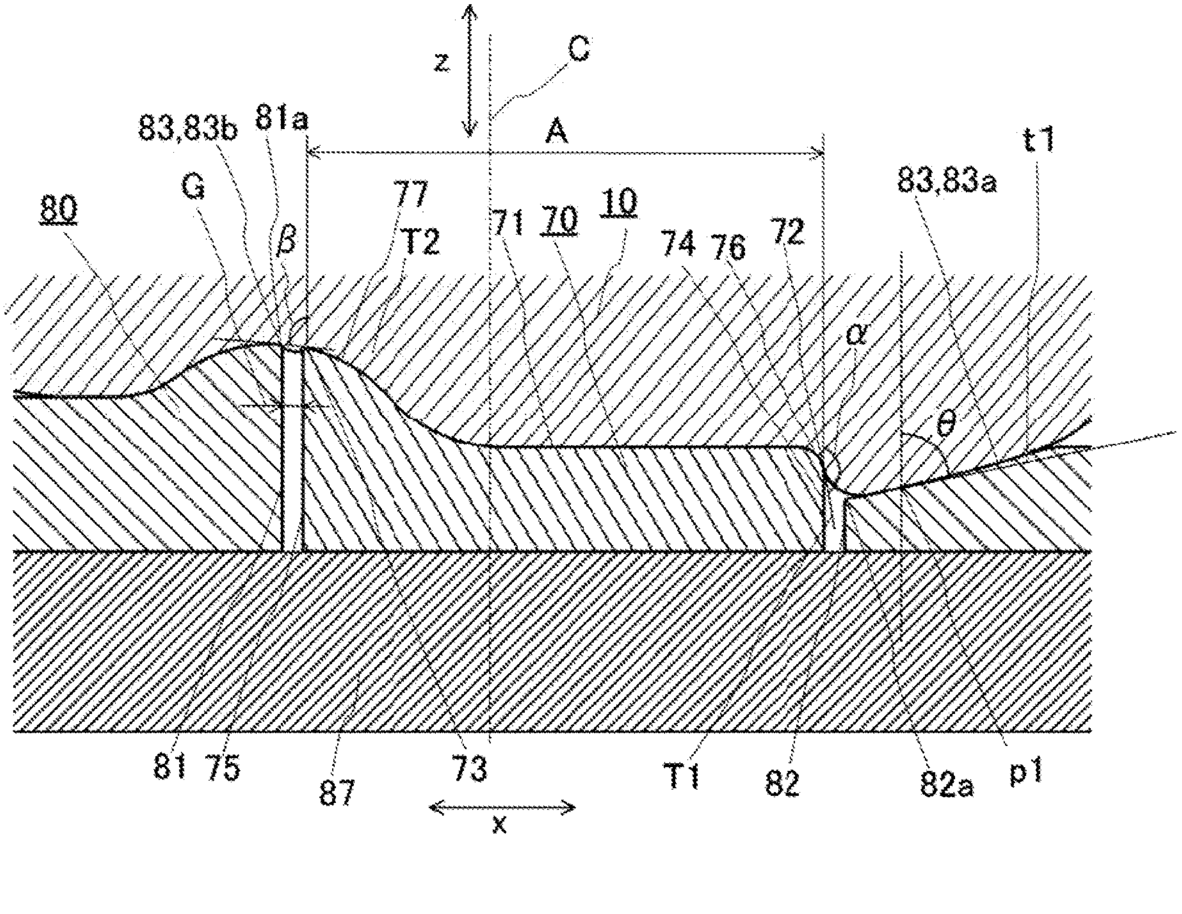
FIG. 6 is a cross-sectional view showing a state in which the printing pad 10 is pushed against the item to be printed 70 according to Embodiment 1.

FIG. 6 is a cross-sectional view showing a state in which the printing pad 10 is pushed against the item to be printed 70 according to Embodiment 1. FIG. 6 is a diagram showing, in an enlarged manner, the item to be printed 70 and an area around the item to be printed 70 in the cross section taken along A-A in FIG. 4. The printing tool 80 is configured such that the inner edges 81 and 82 are caused to face peripheral edge portions 74 and 75 of the item to be printed 70. That is, the printing tool 80 has an inner peripheral surface having a shape conforming to the peripheral edge portions 74 and 75 of the item to be printed 70 at the center portion of a substantially-plate-like part. The printing tool 80 is formed by hollowing out the center portion of the plate-like part into the shape of the item to be printed 70, or is formed by cutting the printing tool 80 with a cutter or the like in conformity with the shape of the item to be printed 70 while plate-like parts are brought into contact with the peripheral edge portions 74 and 75 of the item to be printed 70. The inner edges 81 and 82 are included in the inner peripheral surface formed on the printing tool 80. The inner edges 81 and 82 are disposed adjacent to the peripheral edge portions 74 and 75 of the item to be printed 70, or are disposed with a predetermined gap G formed between the inner edge 81 and the peripheral edge portion 75 and formed between the inner edge 82 and the peripheral edge portion 74. When the gap G has an extremely small size, there is a possibility that the printing pad 10 does not enter the gap G, so that printing is not performed at the end portion of the printing range A. Accordingly, the dimensions of the gap G are set such that a required printing range A can be obtained. It is desirable that the material used for forming the printing tool 80 be a material that can be easily adjusted and that is less likely to damage the printing pad 10, such as resin foam including polyethylene foam. However, the material used for forming the printing tool 80 is not limited to the above.

Figure 7:
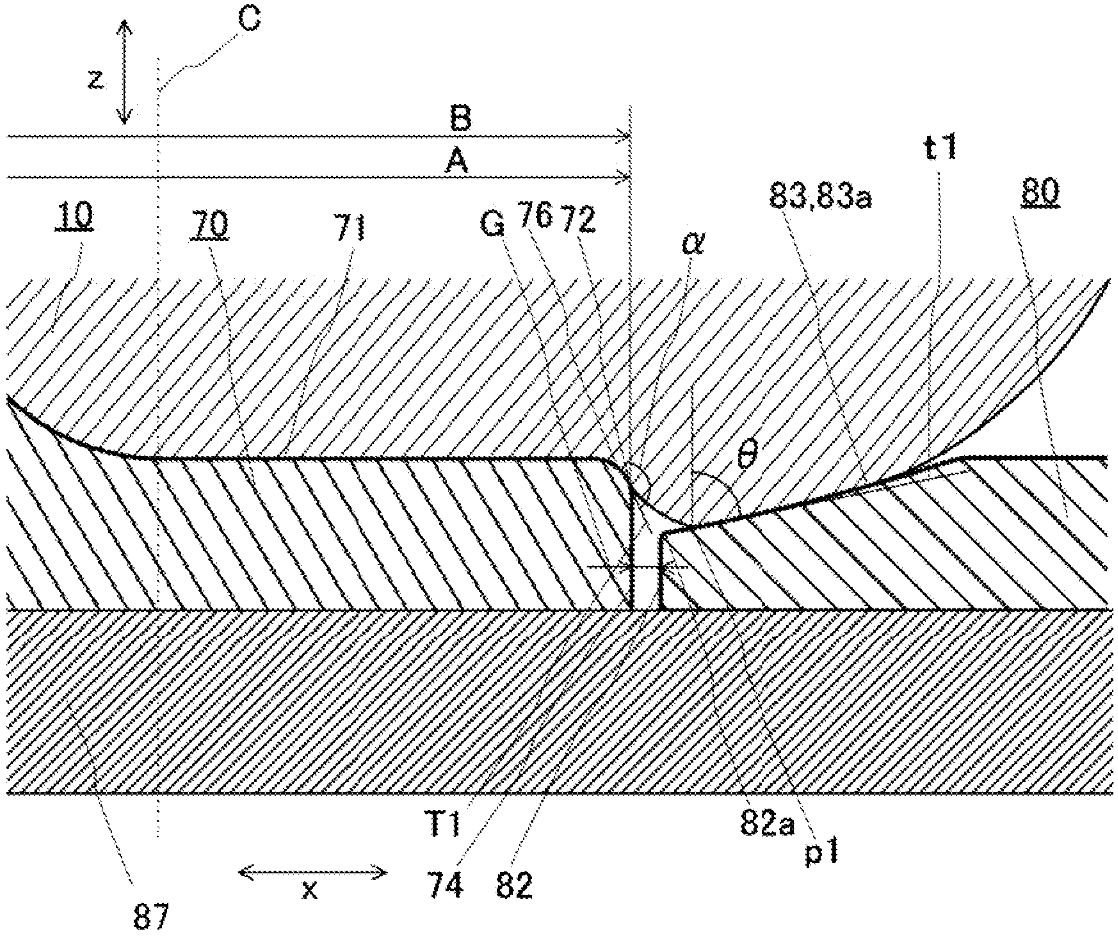
FIG. 7 is an enlarged view of a rounded corner portion 70*a*, which is at the right end of the item to be printed 70 shown in FIG. 6, and an area around the rounded corner portion 70*a*.

FIG. 7 is an enlarged view of a rounded corner portion 70*a*, which is at the right end of the item to be printed 70 shown in FIG. 6, and an area around the rounded corner portion 70*a*. Of the surface of the item to be printed 70, a region outside the printing range A is referred to as "peripheral edge portion". In FIG. 7, the surface of the item to be printed 70 that is located at the right end of the item to be printed 70 and that is parallel to the Z direction and a portion of a rounded corner shape form the peripheral edge portion 74. The upper end of the peripheral edge portion 74 also serves as an outer edge 72 of the printing range A. The peripheral edge portion 74 is suitably set according to the shape of the item to be printed 70 and setting of the printing range A. In FIG. 7, the printing range A is equivalent to the range in which the printing surface 4 is pushed against and in contact with the item to be printed 70 due to the printing pad 10 being pushed against the item to be printed 70. The range in which the printing surface 4 is in contact with the item to be printed 70 is referred to as "contact range B". FIG. 7 shows a state in which the printing range A is equivalent to the contact range B, and shows an ideal state in which a print image transferred to the printing surface 4 is transferred to the printing range A.

The upper end of the peripheral edge portion 74, that is, the outer edge 72 of the surface to be printed 71, is the end of the printing range A. However, in an actual operation, there may be cases where the printing surface 4 of the printing pad 10 is also pushed against a region that includes the peripheral edge portion 74. In this case, although the printing surface 4 of the printing pad 10 is pushed against the item to be printed 70 while exceeding the printing range A (see FIG. 8), a range of a print image to be transferred to the surface of the item to be printed 70 is determined by a print image transferred to the printing surface 4 of the printing pad 10 from the printing original plate 50. That is, the range of the printing surface 4 of the printing pad 10 that is larger than the print image on the printing surface 4 is pushed against the item to be printed 70 and hence, the end of the print image on the printing surface 4 is also surely pushed against the item to be printed 70, so that the print image is transferred to the printing range A. There may be cases where the outer edge 72 of the surface to be printed 71 shown in FIG. 7 is referred to as "first outer edge 72".

In Embodiment 1, the peripheral edge portion 74, which is at the right end of the item to be printed 70, has a surface parallel to the Z direction, and is connected to the rounded corner portion 70*a* at the upper end of the surface parallel to the Z direction. The region of the item to be printed 70 up to a point located at a position closer to the imaginary line C than the upper end of the surface parallel to the Z direction is assumed as the printing range A. In other words, the end of the printing range A, that is, the outer edge 72 of the surface to be printed 71, is located on the surface of the rounded corner portion 70*a*. That is, the upper end of the peripheral edge portion 74 is a point on a rounded corner, and an angle α formed by a tangent T1 to a surface at the upper end and the imaginary line C is larger than 90°. That is, the end of the printing range A has a surface inclined in the direction from the center portion of the item to be printed 70 (the imaginary line C) toward the outside in such a way as to approach the printing stage 87. When printing is performed by pushing the printing pad 10 against such a surface, there may be cases where the printing surface 4 cannot suitably conform to the surface to be printed 71. When the printing pad is strongly pushed against the item to be printed 70 to cause the printing surface 4 to surely come into contact with the end of the printing range A, there may be cases where the printing pad 10 is largely deformed, so that image distortion and slip deformation of ink occur. Further, when the printing pad 10 is strongly pushed against the item to be printed 70, there may be cases where the printing pad 10 is damaged by the rounded corner shape of the item to be printed 70. For this reason, the printing tool 80 is used to cause the printing surface 4 to conform to the surface to be printed 71, and to suppress a situation in which the printing surface 4 is excessively strongly pushed against the corner of the item to be printed 70.

The inner edge 82 of the printing tool 80 is disposed side by side with the peripheral edge portion 74, which is the outer portion of the item to be printed 70 that is disposed adjacent to the printing range A. The inner edge 82 is disposed to face the peripheral edge portion 74 of the item to be printed 70 with the gap G formed therebetween. The printing tool 80 has a pad receiving surface 83 extending outward from an upper end 82*a* of the inner edge 82. The pad receiving surface 83 is an inclined surface having a tangential angle θ of 90° or less relative to the imaginary line C, which passes through the center of the item to be printed 70 and which is parallel to the Z direction. In other words, the pad receiving surface 83 is a surface that is inclined in such a way as to approach the printing stage 87 as the pad receiving surface 83 approaches the item to be printed 70. The pad receiving surface 83 is not limited to a flat surface, and may be a curved surface 83*a*.

The pad receiving surface 83 is the surface that is inclined toward the item to be printed 70 and hence, when the printing pad 10 is pushed against the pad receiving surface 83, the pad receiving surface 83 suppresses deformation in which the printing pad 10 expands outward (in the rightward direction in the X direction in FIG. 7). Further, due to the provision of the pad receiving surface 83, the printing surface 4 can easily conform to the shape of a region including the upper end of the peripheral edge portion 74 of the item to be printed 70 and hence, the printing surface 4 is also pushed against a surface having a tangential angle α of 90° or more at an appropriate load. However, the pad receiving surface 83 is not limited to the above-mentioned mode. The tangential angle θ may be set to be larger than 90°, and there may be cases where the printing tool 80 partially has the pad receiving surface 83 having a tangential angle θ of 90° or more (tangential angle θ≥90°).

The upper end 82*a* of the inner edge 82 is located at a position closer to the printing stage 87 than the end of the printing range A, that is, the outer edge 72 of the surface to be printed 71, in the Z direction. With such a configuration, the printing pad 10 is deformed to enter the gap G formed between the peripheral edge portion 74 and the inner edge 82 and hence, the printing surface 4 is also easily pushed against a surface having an inclination that is almost parallel to the Z direction.

Figure 8:
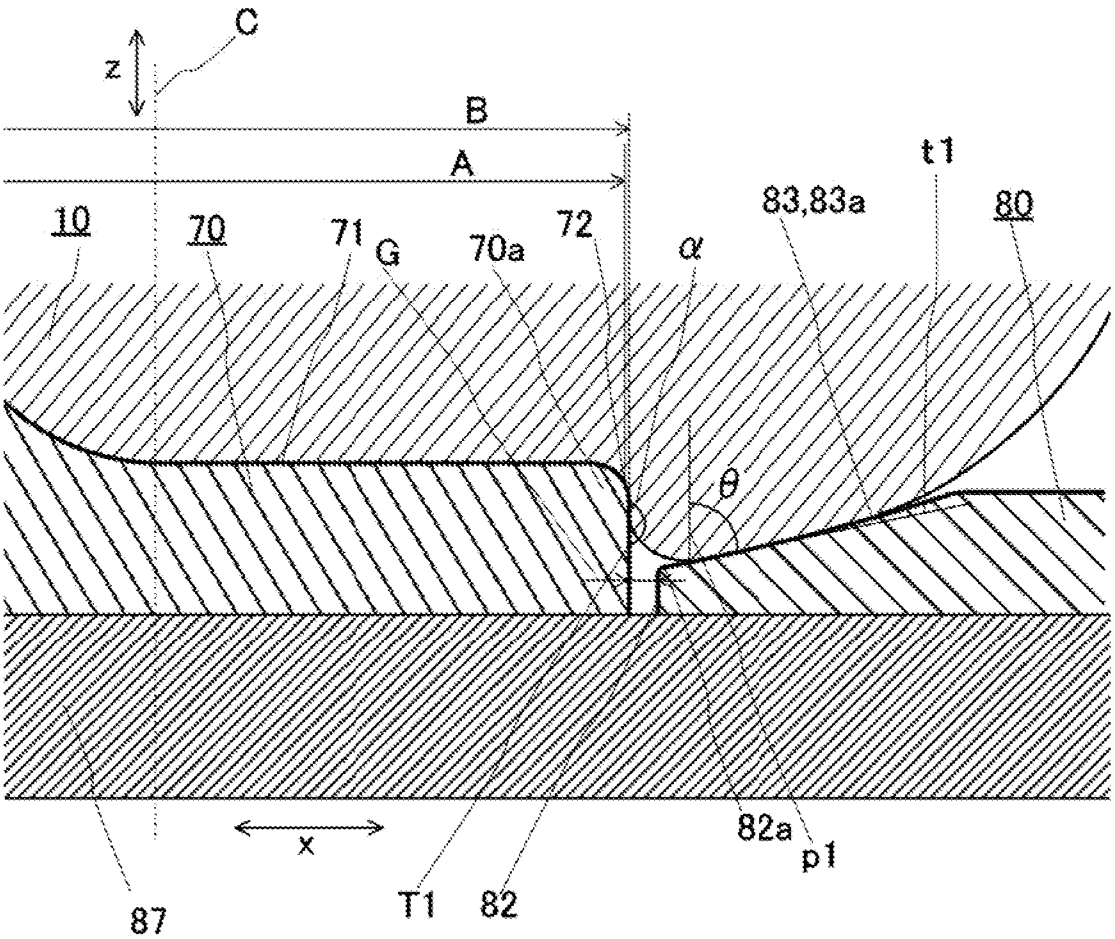
FIG. 8 is a diagram illustrating a contact state of the printing pad 10 in the case where the shape of the printing tool 80 shown in FIG. 7 is changed.

FIG. 8 is a diagram illustrating a contact state of the printing pad 10 in the case where the shape of the printing tool 80 shown in FIG. 7 is changed. In FIG. 8, the dimensions of the printing tool 80 are changed such that the upper end 82*a* of the inner edge 82 of the printing tool 80 are moved toward the printing stage 87 compared with the case shown in FIG. 7. With such a configuration, the upper end 82*a* of the inner edge 82 and the pad receiving surface 83 is moved downward, so that the contact range B further expands outward (toward the printing stage 87). The contact range B is moved toward the printing stage 87 compared with the range shown in FIG. 7, and a tangential angle α at the end of the contact range B is 180° or an angle close to 180°. In such a case, the contact range B is larger than the printing range A and hence, all of a print image transferred to the printing surface 4 of the printing pad 10 is transferred to the surface to be printed 71, so that the print image is formed in a desired printing range A.

However, when the printing tool 80 shown in FIG. 8 has a large distance in the Z direction between the upper end 82*a* of the inner edge 82 of the printing tool 80 and the outer edge 72 of the surface to be printed 71, the printing pad 10 is strongly pushed against the rounded corner portion 70*a* of an item to be printed, thus being easily damaged. Further, large deformation occurs in the printing pad 10 and hence, an image is expanded, and slippage deformation of ink is likely to occur. For this reason, also in the case where the contact range B is larger than the printing range A as shown in FIG. 8, the position of the upper end 82*a* of the inner edge 82 of the printing tool 80 is adjusted such that the contact range B is prevented from becoming excessively larger than the printing range A.

Figure 9:
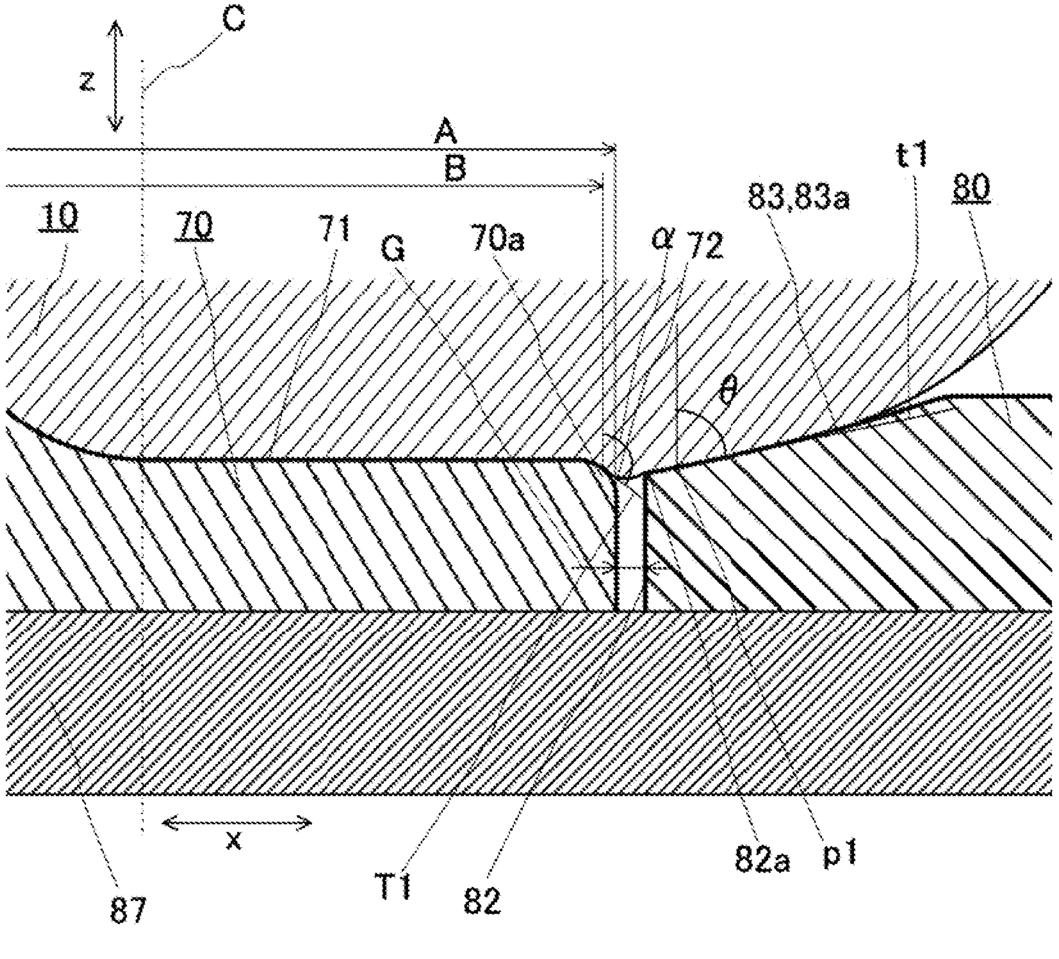
FIG. 9 is a diagram illustrating a contact state of the printing pad 10 in the case where the shape of the printing tool 80 shown in FIG. 7 is changed.

FIG. 9 is a diagram illustrating a contact state of the printing pad 10 in the case where the shape of the printing tool 80 shown in FIG. 7 is changed. In FIG. 9, the dimensions of the printing tool 80 are changed such that the upper end 82*a* of the inner edge 82 of the printing tool 80 is moved in the direction away from the printing stage 87 compared with the case shown in FIG. 7. With such a configuration, the upper end 82*a* of the inner edge 82 and the pad receiving surface 83 are moved upward, so that a contact range B contracts inward (in the direction away from the printing stage 87). The outer edge 72 of the surface to be printed 71, being the end of the printing range A, is moved toward the center of the item to be printed 70, and a tangential angle α at the outer edge 72 is an angle that is more than 90° but is close to 90°. In this case, the contact range B of the printing pad 10 is smaller than the printing range A, so that the end portion of a print image transferred to the printing surface 4 is not pushed against the surface to be printed 71, thus not being transferred to the surface to be printed 71.

However, even in the case of the printing tool 80 as shown in FIG. 9, when the printing range A is set to a region located on the inner side (located at a position close to the imaginary line C), it is possible to surely transfer a print image on the printing pad 10 to the surface to be printed 71. The printing tool 80 shown in FIG. 9 is formed such that a tangential angle θ of the pad receiving surface 83 relative to the imaginary line C is less than 90° and hence, the printing pad 10 is deformed to enter the gap G, thus being appropriately pushed against the region including the rounded corner portion 70*a* of the item to be printed 70, being the upper end of the peripheral edge portion 74.

Figure 10:
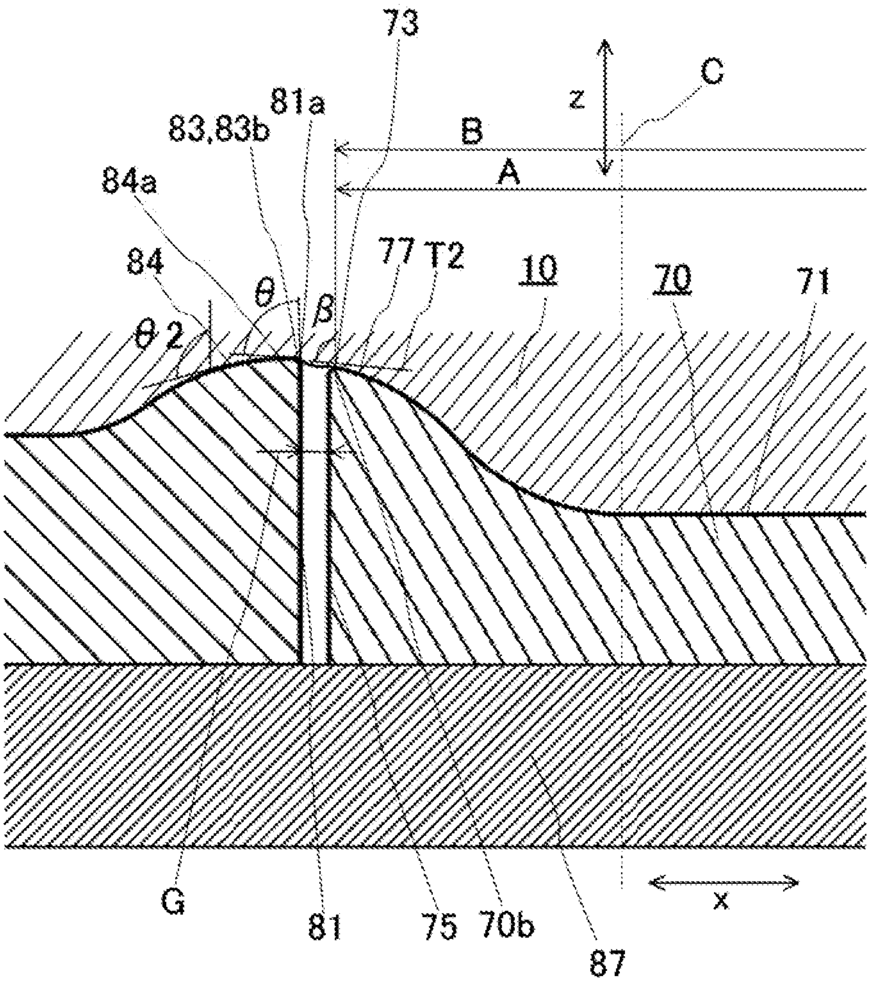
FIG. 10 is an enlarged view of a protruding portion, which is at the left end of the item to be printed 70 shown in FIG. 6, and an area around the protruding portion.

FIG. 10 is an enlarged view of the protruding portion, which is at the left end of the item to be printed 70 shown in FIG. 6, and an area around the protruding portion. In FIG. 10, the surface of the item to be printed 70 that is at the left end of the item to be printed 70 and that is parallel to the Z direction and a portion of the rounded corner shape of a protruding portion 70*b* form the peripheral edge portion 75. The upper end of the peripheral edge portion 75 forms an outer edge 73 of the surface to be printed 77, being the end of the printing range A. The peripheral edge portion 75 is suitably set according to the shape of the item to be printed 70 and setting of the printing range A. The range in which the printing surface 4 is in contact with the item to be printed 70 is referred to as "contact range B". FIG. 10 shows a state in which the printing range A is equivalent to the contact range B, and shows an ideal state in which a print image transferred to the printing surface 4 is transferred to the printing range A.

The upper end of the peripheral edge portion 75 is the end of the printing range A. However, in an actual operation, there may be cases where the printing surface 4 of the printing pad 10 is also pushed against a region that includes the peripheral edge portion 75 shown in FIG. 10. In this case, although the printing surface 4 of the printing pad 10 is pushed against the item to be printed 70 while exceeding the printing range A, a configuration is adopted in which a range of a print image to be transferred to the surface of the item to be printed 70 is determined by a print image transferred to the printing surface 4 of the printing pad 10 from the printing original plate 50. That is, the range of the printing surface 4 of the printing pad 10 that is larger than the print image on the printing surface 4 is pushed against the item to be printed 70 and hence, the end of the print image on the printing surface 4 is also surely pushed against the item to be printed 70, so that the print image is transferred to the printing range A.

In Embodiment 1, the peripheral edge portion 75, which is at the left end of the item to be printed 70, has a surface parallel to the Z direction, and is connected to the surface to be printed 77 via a rounded corner portion at the upper end of the surface parallel to the Z direction. In the item to be printed 70 shown in FIG. 10, the printing range A is assumed as a region from the center portion at which the imaginary line C is located to a point located at a position slightly closer to the imaginary line C than the apex of the protruding portion 70*b*. The upper end of the peripheral edge portion 75 is a point on the rounded corner of the protruding portion 70*b*, and is the outer edge 73 of the surface to be printed 77. A tangent T2 to the surface of the outer edge 73 of the surface to be printed 77 and the imaginary line C form an angle β. When printing is performed on such a surface without using the printing tool 80 by pushing the printing pad 10 against the surface, a high surface pressure is applied to the printing surface 4 that is brought into contact with the protruding portion 70*b*, so that there is a possibility of the printing surface 4 being damaged. Further, when the printing pad is strongly pushed against the item to be printed 70 to cause the printing surface 4 to also surely come into contact with the end of the printing range A, there may be cases where the printing pad 10 is largely deformed, so that image distortion and slip deformation of ink occur. Further, when the printing pad 10 is strongly pushed against the item to be printed 70, there may be cases where the printing pad 10 is damaged by the rounded corner shape of the protruding portion 70*b*. For this reason, the printing tool 80 is used to cause the printing surface 4 to conform to the surface to be printed 77, and to suppress a situation in which the printing surface 4 is excessively strongly pushed against the corner of the item to be printed 70.

The inner edge 81 of the printing tool 80 is disposed side by side with the peripheral edge portion 75, which is the outer portion of the item to be printed 70 that is disposed adjacent to the printing range A. The inner edge 81 is disposed to face the peripheral edge portion 75 of the item to be printed 70 with the gap G formed therebetween. The printing tool 80 has a pad receiving surface 83*b* extending outward from an upper end 81*a* of the inner edge 81. The pad receiving surface 83*b* is an inclined surface forming a tangential angle θ with the imaginary line C, which passes through the center of the item to be printed 70 and which is parallel to the Z direction. The tangential angle θ of the pad receiving surface 83*b* is set to be substantially equal to a tangential angle β at the upper end of the peripheral edge portion 75 of the item to be printed 70, that is, at the outer edge 73 of the surface to be printed 77. In FIG. 10, the pad receiving surface 83*b*, except for the gap G and the rounded portion at the corner, has a shape obtained by extending the surface to be printed 77 outward or is formed at a position higher than the surface to be printed 77 and hence, it is possible to suppress rapid deformation of the printing surface 4 when the printing surface 4 conforms to the shape of a region including the upper end of the peripheral edge portion 75 of the item to be printed 70.

A second pad receiving surface 84 is connected to the outer side of the pad receiving surface 83*b*. The second pad receiving surface 84 has inclination that is reduced toward the outside, for example, by using an apex 84*a* as a boundary. That is, a tangential angle θ2 of the second pad receiving surface 84 relative to the imaginary line C may be set to be larger than 90°. Tangential angles of the pad receiving surfaces 83*b* and 84, which are disposed side by side with the surface to be printed 77 of the item to be printed 70, are gradually changed, so that when the printing pad 10 is brought into contact with the printing tool 80, the printing tool 80 suppresses local deformation of the printing surface 4 that comes into contact with the printing tool 80. With such a configuration, even in the case where the item to be printed 70 has a shape including a portion that protrudes from other portions in cross section as in the case of the protruding portion 70*b*, the printing pad 10 is pushed against the item to be printed 70 in such a way as to uniformly apply a load to the item to be printed 70. Further, the second pad receiving surface 84 is disposed outside the pad receiving surface 83*b* and hence, there is no possibility that outward deformation (deformation in the leftward direction in the X direction) or inward deformation (deformation in the rightward direction in the X direction) of the printing pad 10 is excessively suppressed. Accordingly, it is possible to suppress a situation in which the printing surface 4 is deformed in such a way as to slide on the surface to be printed 77, so that accuracy of the print image is reduced. It is desirable that the pad receiving surface 83 and the second pad receiving surface 84 be smoothly connected to each other at the apex 84*a*.

The printing pad 10 is suitably deformed to enter the gap G formed between the peripheral edge portion 74 and the inner edge 82. Therefore, the printing surface 4 is easily pushed against a surface having an acute corner portion, as in the case of the protruding portion 70*b*.

Figure 11:
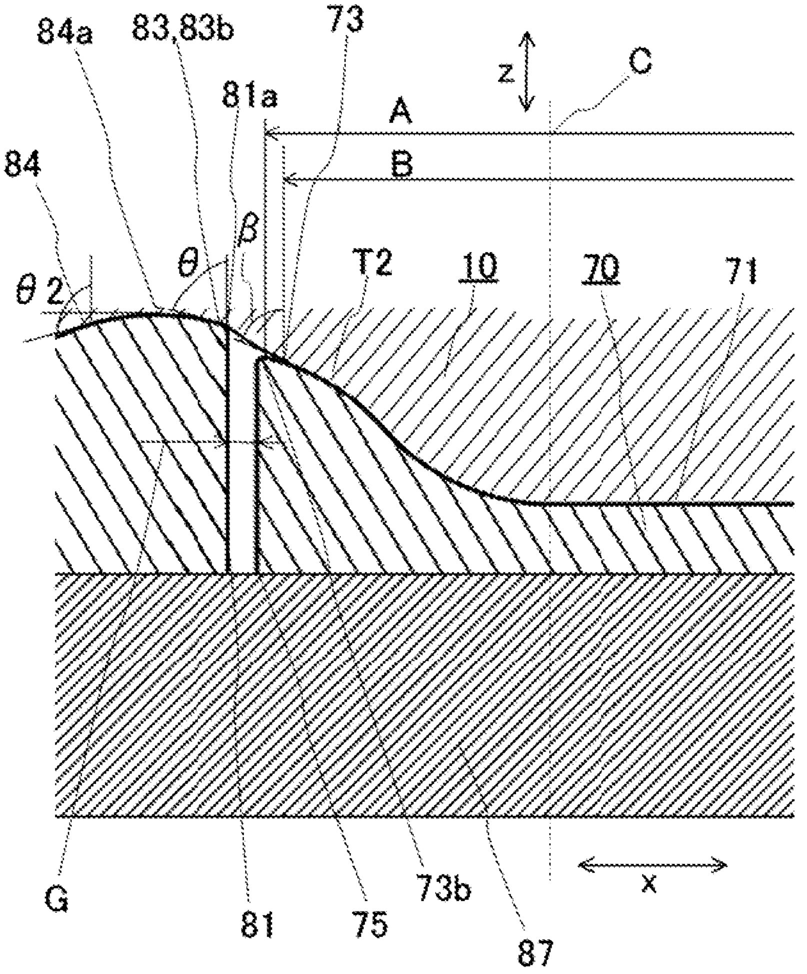
FIG. 11 is a diagram illustrating a contact state of the printing pad 10 in the case where the shape of the printing tool 80 shown in FIG. 10 is changed.

FIG. 11 is a diagram illustrating a contact state of the printing pad 10 in the case where the shape of the printing tool 80 shown in FIG. 10 is changed. In FIG. 11, the dimensions of the printing tool 80 are changed such that the upper end 81*a* of the inner edge 81 of the printing tool 80 is moved in the direction away from the printing stage 87 compared with the case shown in FIG. 10. With such a configuration, the upper end 81*a* of the inner edge 81 and the pad receiving surface 83*b* are moved upward, so that a contact range B further contracts inward (in the direction toward the imaginary line C). The end of the contact range B is moved to a position closer to the imaginary line C than the outer edge 73 of the surface to be printed 77, being the original end of the printing range A, so that a tangential angle β at the end of the contact range B is an angle smaller than that in the case shown in FIG. 10. For example, the tangential angle β is 90° or less. In this case, the contact range B of the printing pad 10 is smaller than the printing range A, so that the end portion of a print image transferred to the printing surface 4 is not pushed against the surface to be printed 71, thus not being transferred to the surface to be printed 71.

However, even in such a case, when the printing range A is set to a region located on the inner side (located at a position close to the imaginary line C), it is possible to surely transfer a print image on the printing pad 10 to the surface to be printed 71. The printing tool 80 shown in FIG. 11 is formed such that a tangential angle θ of the pad receiving surface 83*b* relative to the imaginary line C is smaller than 90° and hence, the printing pad 10 is deformed to enter the gap G, thus being appropriately pushed against the region including the printing range A. The tangential angle θ is not limited to the above-mentioned mode, and may be set to 90° or more. The pad receiving surface 83*b* is not limited to the above-mentioned mode. The tangential angle θ may be set to 90° or more, and there may be cases where the printing tool 80 partially has the pad receiving surface 83*b* having a tangential angle θ of 90° or more (tangential angle θ≥90°).

Figure 12:
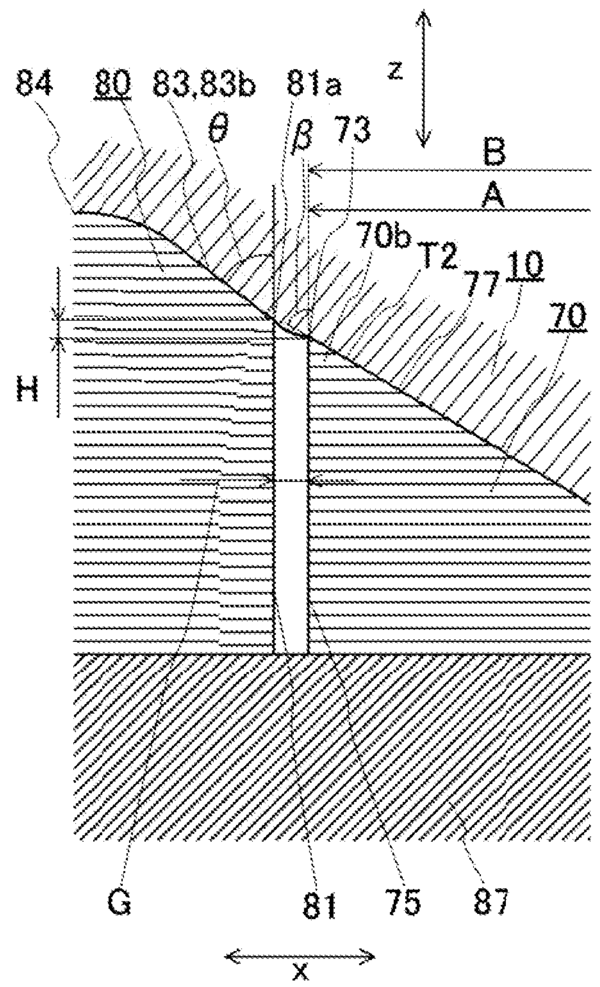
FIG. 12 is a diagram illustrating a contact state of the printing pad 10 in the case where the shape of the printing tool 80 shown in FIG. 10 is changed.

FIG. 12 is a diagram illustrating a contact state of the printing pad 10 in the case where the shape of the printing tool 80 shown in FIG. 10 is changed. In FIG. 12, the dimensions of the printing tool 80 are changed such that the upper end 81*a* of the inner edge 81 of the printing tool 80 is moved in the direction away from the printing stage 87 compared with the case shown in FIG. 10. In FIG. 12, the protruding portion 70*b* of the item to be printed 70 is formed to have an acute angle in cross section. In such a case, it is desirable to form the printing tool 80 such that the pad receiving surface 83*b* is disposed on the extension of the surface to be printed 77 of the item to be printed 70 to prevent the printing pad 10 from being strongly pushed against the distal end of the protruding portion 70*b*. There is the gap G between the item to be printed 70 and the printing tool 80 and hence, when the printing pad 10 is deformed to enter the gap G, the printing pad 10 is also surely pushed against the end of the printing range A. With such a configuration, the printing pad 10 is also appropriately pushed against the distal end of the protruding portion 70*b* that falls within the printing range A.

Also in FIG. 12, the second pad receiving surface 84 may be installed in a state of being disposed adjacent to the pad receiving surface 83*b*, and a tangential angle 62 relative to the imaginary line C may be set to be larger than 90°. With such a configuration, local deformation of the printing surface 4 is suppressed when the printing pad 10 is brought into contact with the printing tool 80.

(Material of Printing Tool 80)

The printing tool 80 is made of a material having higher hardness than silicone rubber that forms the printing pad 10. For example, it is preferable that the printing tool 80 be made of foamed plastic, such as polystyrene foam, and it is desirable to use a material having a small amount of deformation when the printing pad 10 is pushed against the printing tool 80. Further, to allow the printing tool 80 to change in shape corresponding to the shape of the item to be printed 70 and the printing range A, it is desirable that the printing tool 80 be made of a material that can be easily processed. For example, the printing tool 80 is made of foam, such as polyethylene foam, or polyolefin. It is desirable that the material used for forming the printing tool 80 be a material that can be cut with a cutter or the like and that allows fine adjustment.

<Method for Producing Item to be Printed 70 with Printing Apparatus 100>

Figure 13:
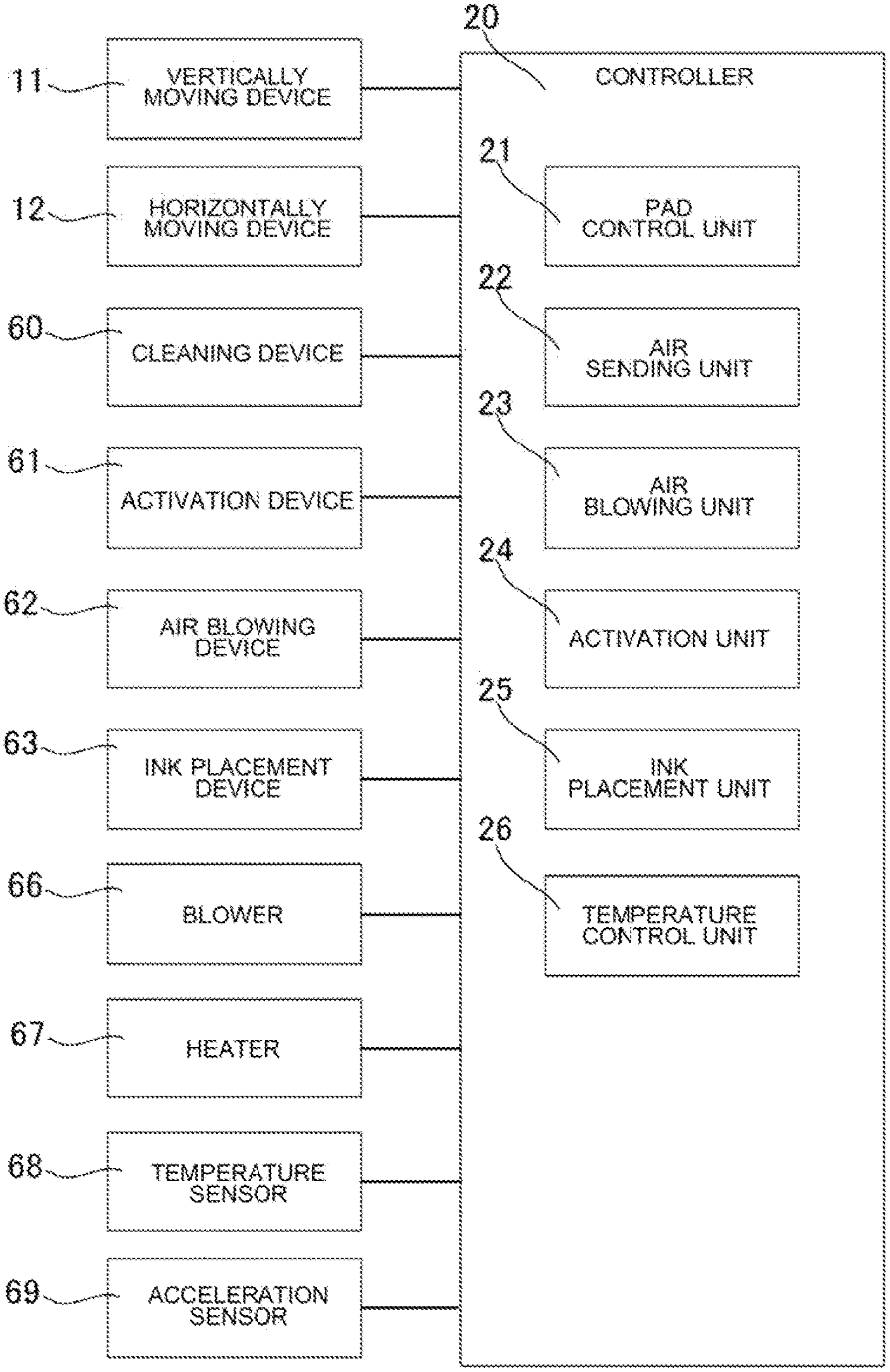
FIG. 13 shows one example of a function block diagram of the printing apparatus 100 according to Embodiment 1.

FIG. 13 shows one example of a function block diagram of the printing apparatus 100 according to Embodiment 1. Next, a method for producing an item to be printed with the printing apparatus 100 will be described. As shown in FIG. 1, the printing apparatus 100 includes a controller 20. The controller 20 is a microcomputer, for example, and includes an arithmetic unit 20*a* and a storage device 20*b*. The functions of the controller 20, that is, respective functional blocks shown in FIG. 8, are implemented by using the arithmetic unit 20*a* and the storage device 20*b* (see FIG. 1).

The storage device 20*b* is a ROM, a RAM, or the like, for example, the ROM holding a program and data, for example, in advance, the RAM being provided for temporarily storing data in executing the program. As the storage device 20*b*, a nonvolatile or volatile semiconductor memory is used, such as a flash memory, an erasable and programmable ROM (EPROM), and an electrically erasable and programmable ROM (EEPROM). Further, as the storage device 20*b*, for example, a detachable recording medium may be used, such as a magnetic disk, a flexible disk, an optical disc, a compact disc (CD), a mini disc (MD), and a digital versatile disc (DVD). The storage device 20*b* can store information obtained from the temperature sensor 68 or other sensors and information processed by the arithmetic unit 20*a*.

The arithmetic unit 20*a* is a unit that performs, for example, various processes for executing the functions of the controller 20. For example, the arithmetic unit 20*a* serves as a pad control unit 21, thus processing information on coordinates of the vertically moving device 11 and the horizontally moving device 12, information from an acceleration sensor 69, and the like, and controlling the movement of the printing pad 10. In addition to the above, the arithmetic unit 20*a* serves as an air sending unit 22, an air blowing unit 23, an activation unit 24, an ink placement unit 25, or a temperature control unit 26. The air sending unit 22 controls the operation of the blowers 66. The temperature control unit 26 controls the operation of the heaters 67 included in the blowers 66 based on information from the temperature sensor 68, for example. The air blowing unit 23 controls the operation of the air blowing device 62. The activation unit 24 holds the activation device 61 in an appropriate state based on information on the state (the amount of liquid, for example) of the activation device 61. The ink placement unit 25 controls the operation of the ink placement device 63, that is, the operation of arranging ink 40 on the printing original plate 50. Note that it is not necessary for the controller 20 to have all of the above-mentioned respective functions, and the controller 20 need not include the air sending unit 22, the air blowing unit 23, the activation unit 24, or the temperature control unit 26 corresponding to the specifications of the printing apparatus 100.

Figure 14:
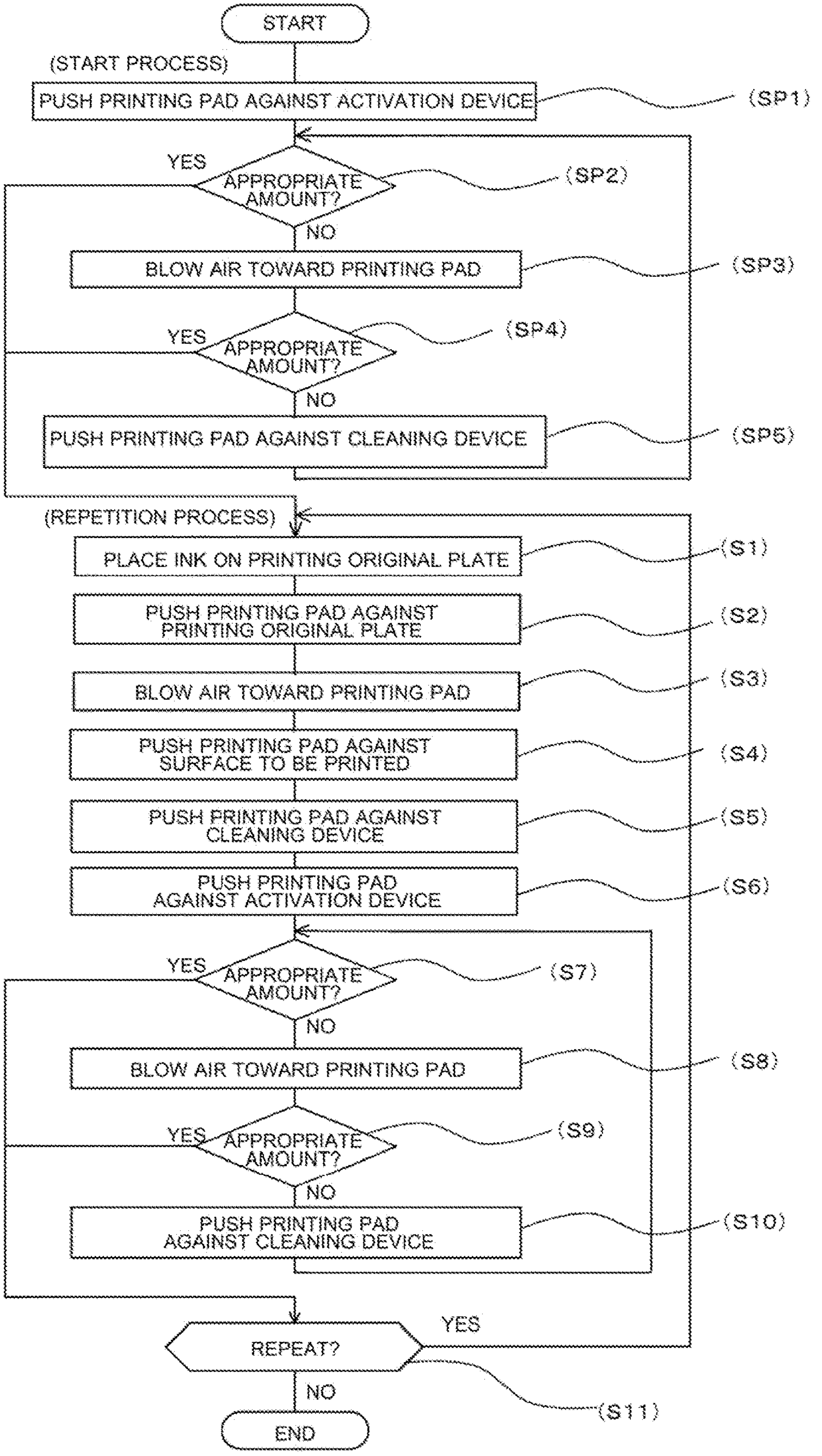
FIG. 14 is a flowchart of one example of a method for producing an item to be printed 70 with the printing apparatus 100 according to Embodiment 1.

FIG. 14 is a flowchart of one example of the method for producing the item to be printed 70 with the printing apparatus 100 according to Embodiment 1. The method for producing the item to be printed 70 with the printing apparatus 100 includes a start process and a repetition process, the start process being performed at the time of turning on the printing apparatus 100 or at the time of restarting the operation, the repetition process being performed to produce a plurality of items to be printed 70. The start process is performed according to the state of the printing pad 10, and may be omitted.

(Start Process)

The start process is a process performed immediately after the printing apparatus 100 is turned on, for example. Immediately after the production of the item to be printed 70 is started, there may be the case where the surface of the printing pad 10 is not activated. Therefore, a step of appropriately activating the printing surface 4 of the printing pad 10 is performed. The printing pad 10 is made of a material to which a hard ink 40 is less likely to adhere, such as silicone rubber, and hence, there may be cases where the ink 40 is not transferred as intended even when the printing pad 10 is directly pushed against the printing original plate 50. For this reason, the printing apparatus 100 according to Embodiment 1 activates the printing surface 4 in the start process as necessary.

First, after the printing apparatus 100 is turned on, the printing apparatus 100 causes the printing pad 10 to move to an area above the activation device 61 and, then, to move downward toward the activation device 61. After the printing surface 4 is pushed against the absorbing unit of the activation device 61, so that a predetermined range including the printing surface 4 comes into contact with the absorbing unit, the printing pad 10 is elevated. Such an operation is referred to as an activation step (SP1). By performing such a step, liquid, such as water or solvent, permeating into the absorbing unit of the activation device 61 adheres to or permeates into the printing surface 4 of the printing pad 10. Fine unevenness is formed on the surface of the printing surface 4, thus allowing the printing surface 4 to hold liquid from the absorbing unit when the liquid adheres to the surface of the printing surface 4. It is desirable that the unevenness be formed on the printing surface 4 with a height difference of 2 to 5 μm. The pad control unit 21 of the controller 20 controls the vertically moving device 11 and the horizontally moving device 12. Such a control controls the position of the printing pad 10, the movement of the printing pad 10 to the activation device 61 from a position of the printing pad 10 when the production is started, and an action of pushing the printing pad 10. The activation unit 24 performs a control or makes a notification to cause the amount of liquid contained in the absorbing unit of the activation device 61 to be maintained at a predetermined amount. In the case where the absorbing unit deteriorates, the activation unit 24 performs a control or makes a notification to renew the absorbing unit.

After the activation step (SP1) is completed, it is determined whether the amount of liquid adhering to the printing surface 4 of the printing pad 10 is appropriate (SP2). When the amount of the liquid adhering to the printing surface 4 is not appropriate (NO in SP2), the printing apparatus 100 performs an air blowing step (SP3). In the air blowing step, the air blowing device 62 blows air toward the printing surface 4 of the printing pad 10 to remove excess liquid adhering to the printing surface 4. The case where the amount of liquid adhering to the printing surface 4 is not appropriate means the case where the excessively large amount of liquid adheres to the printing surface 4. The air blowing unit 23 of the controller 20 is a unit that controls the operation of the air blowing device 62. The air blowing unit 23 drives the air blowing device 62 such that the air blowing step is performed when the printing pad 10 is moved to an area where air sent from the air blowing device 62 impinges on the printing pad 10.

After the air blowing step (SP3) is completed, it is determined whether the amount of liquid adhering to the printing surface 4 of the printing pad 10 is appropriate (SP4). When excess water or solvent still adheres to the printing surface 4 of the printing pad 10 (NO in SP4), the printing apparatus 100 performs an absorption step (SP5). In the absorption step, the printing apparatus 100 pushes the printing surface 4 of the printing pad 10 against the cleaning device 60. With such an operation, the excess liquid adhering to the printing surface 4 of the printing pad 10 is removed.

When the amount of water or solvent adhering to or permeating into the printing pad 10 is appropriate (YES in SP2 or YES in SP4), one or both of the air blowing step (SP3) and the absorption step (SP5) may be omitted. The order of performing the air blowing step and the absorption step may be changed. Further, the air blowing step and the absorption step may be performed a plurality of times. Whether the amount of liquid adhering to the printing surface 4 is appropriate may be visually checked by the operator. When the operator determines that excess liquid adheres to the printing surface 4, the operator may give an instruction to perform the absorption step, so that the pad control unit 21 of the controller 20 moves the printing pad 10 to perform at least one of either the air blowing step or the absorption step.

(Repetition Process)

After the start process is completed, and the printing surface 4 of the printing pad 10 is appropriately activated, the process advances to the repetition process. The repetition process includes an ink placement step (S1), an ink transfer step (S2), an air sending step (S3), a printing step (S4), a cleaning step (S5), an activation step (S6), an air blowing step (S8), and an absorption step (S10). As shown in FIG. 8, the printing apparatus 100 performs the ink placement step (S1), the ink transfer step (S2), the air sending step (S3), the printing step (S4), the cleaning step (S5), the activation step (S6), the air blowing step (S8), and the absorption step (S10) in this order. However, the order of steps in the repetition process is not limited to such an order. For example, after the ink placement step (S1) and the ink transfer step (S2) are completed, the printing apparatus 100 performs steps from the air sending step (S3) to the absorption step (S10).

However, the printing apparatus 100 may perform the ink placement step (S1) of a next cycle in parallel while the steps from the air sending step (S3) to the absorption step (S10) are performed.

In the repetition process, a print image is formed on the surface of an item to be printed 70 each time the printing step (S4) is performed. The number of items to be printed 70 is not limited to one, and printing may be performed on a plurality of items to be printed simultaneously. In the case where the printing is performed on the plurality of items to be printed simultaneously, a plurality of printing pads 10 may be installed to the printing apparatus 100.

(Ink Placement Step)

The ink placement step (S1) is a step of placing the ink 40 on the printing original plate 50 with the ink placement device 63. The ink placement device 63 causes the ink holding unit 64 to rotate on the placement surface 51 of the printing original plate 50 with the ink holding unit 64 being in contact with the placement surface 51. The ink 40 absorbed by the ink holding unit 64 is placed only in an ink-philic region 58 provided to the placement surface 51. The ink holding unit 64 into which the ink 40 is absorbed also comes into contact with an ink-phobic region 57. However, the ink-phobic region 57 repels the ink 40, so that the ink 40 is not placed in the ink-phobic region 57. To allow the ink 40 to be repelled by the ink-phobic region 57, it is desirable to set a hard ink 40. For example, it is preferable to set the viscosity of the ink 40 to a range of 700 P to 1200 P (Poise). The ink placement unit 25 of the controller 20 controls the action of the ink placement device 63 such that the ink 40 is placed on the printing original plate 50 before the printing pad 10 is pushed against the printing original plate 50.

(Ink Transfer Step)

In the ink transfer step (S2), the printing surface 4 of the printing pad 10 is pushed against the placement surface 51 of the printing original plate 50. The printing surface 4 of the printing pad 10 comes into contact with the ink 40 placed in the ink-philic region 58 of the printing original plate 50 shown in FIG. 11. Thereafter, the printing pad 10 moves upward, so that the printing surface 4 is separated from the placement surface 51 of the printing original plate 50. The ink 40, which comes into contact with the printing surface 4, directly moves to the printing surface 4. The ink 40 is arranged on the printing surface 4 corresponding to the ink-philic region 58 disposed on the placement surface 51 of the printing original plate 50. The action of pushing the printing pad 10 against the printing original plate 50 is also controlled by the pad control unit 21.

Water or solvent adheres to or permeates into the printing surface 4 of the printing pad 10 in the activation step (SP1 or S6), so that the ink 40 can easily adhere to the printing surface 4 of the printing pad 10. In particular, to obtain a print image with high accuracy, it is necessary to reduce the size per dot of the ink 40 transferred to the printing surface 4, and it is also necessary to reduce a distance between adjacent portions of the ink 40. Therefore, it is desirable to use the ink 40 with high viscosity. Specifically, as described above, it is desirable to set the viscosity of the ink 40 to a range of 700 P to 1200 P. In the printing apparatus 100, the printing surface 4 of the printing pad 10 is activated by the activation device 61, so that even the ink 40 with high viscosity can easily adhere to the printing surface 4 of the printing pad 10.

(Air Sending Step)

In the air sending step (S3), the printing pad 10 is moved to a position where air sent from the blower 66 impinges on the printing surface 4. When the printing pad 10 is moved to a predetermined position, the operation of the blowers 66 is started, so that air is blown toward the printing surface 4. After the lapse of a predetermined time period from when air is blown toward the printing surface 4, the air sending unit 22 of the controller 20 may perform a control of stopping the operation of the blowers 66, or may perform a control of starting the movement of the printing pad 10 being in a stopped state. The temperature of air blown out from the blower 66 is controlled to 40 to 80 degrees C., for example.

In the air sending step (S3), a time period during which air is blown toward the printing pad 10 may be controlled according to information on the temperature of surroundings in the room. The air sending unit 22 receives information on the temperature of the room from a temperature sensor 28, and controls the operation of the blower 66 such that an operation of blowing air is performed for a time period of a length that is set according to the information on the temperature of the room. For example, when the temperature of the room is high, the air sending unit 22 performs a control of shortening the time period during which air is blown, for example.

The air sending unit 22 may also adjust the length of the time period during which air is blown according to information from the temperature control unit 26 that controls output from the heater 67 incorporated in each blower 66. Specifically, based on information on the temperature of air blown out from the blower 66, the air sending unit 22 controls the amount of air to be blown, the temperature of the air being measured by the temperature sensor 68. It is preferable to adjust the viscosity of the ink 40 on the printing surface 4 to a range of 900 P or more and 1100 P or less, for example, by blowing air. However, the viscosity of ink is not limited to the viscosity described above.

(Printing Step)

In the printing step (S4), the printing surface 4 of the printing pad 10 with the ink 40 adhering to the printing surface 4 is pushed against the item to be printed 70. The printing apparatus 100 according to Embodiment 1 can perform printing on the surface to be printed 71 of the item to be printed 70 as shown in FIG. 3 and FIG. 4. The surface to be printed 71 may have unevenness including a flat surface and a curved surface. The printing range A may have a surface inclined relative to or a surface parallel to the Z direction along which the printing pad 10 moves. In printing step (S4), the printing pad 10 is pushed against toward the printing stage 87 such that the printing surface 4 to which the ink 40 adheres is brought into close contact with the surface to be printed 71. The ink 40 adhering to the printing surface 4 comes into contact with and is transferred to the printing range A. The movement of the printing pad 10 in the printing step is also controlled by the pad control unit 21.

The item to be printed 70 is disposed in such a way as to be enclosed by the printing tool 80, for example, and is positioned and fixed on the printing stage 87. With such a configuration, the positional relationship between the printing pad 10, the item to be printed 70, and the printing tool 80 is determined, so that the printing can be performed on the surface to be printed 71 with high accuracy. The printing pad 10 is pushed against not only the surface to be printed 71, but also the surface of the printing tool 80. As shown in FIG. 6 to FIG. 12, the printing tool 80 includes the pad receiving surface 83, or includes the pad receiving surface 83 and the second pad receiving surface 84 to restrict deformation of the printing pad 10, thus allowing a load to be applied to the printing range A from the printing pad 10 as uniformly as possible. The vertically moving device 11 is controlled such that the printing pad 10 is pushed against at least the pad receiving surface 83 during printing.

The printing tool 80 is formed corresponding to the shape of the item to be printed 70 and the printing range A. The printing tool 80 suppresses damage to the printing pad 10 by suppressing unnecessary deformation of the printing pad 10, thus suppressing print image distortion and slippage between the printing surface 4 and the surface to be printed 71.

(Cleaning Step)

In the Cleaning step (S5), the printing surface 4 of the printing pad 10 from which the ink 40 is transferred to the surface to be printed 71 is pushed against a flat cleaning surface of the cleaning device 60. The ink 40 remaining on the printing pad 10 is caused to adhere to the cleaning surface. The cleaning surface is a piece of paper or an adhesive tape. However, the material of the cleaning surface is not limited to the above.

(Activation Step, Air Blowing Step, Absorption Step)

The activation step (S6) is a step substantially equal to the activation step (SP1) in the start process. The air blowing step (S8) is a step substantially equal to the air blowing step (SP3) in the start process. The absorption step (S10) is a step substantially equal to the absorption step (SP5) in the start process. The air blowing step (S6) and the absorption step (S10) are performed corresponding to the amount of liquid, such as water or solvent, adhering to the printing surface 4 of the printing pad 10. Either one of the air blowing step (S6) or the absorption step (S10) may be omitted, or at least one of either the air blowing step (S6) or the absorption step (S10) may be performed a plurality of times. Each of the air blowing step (S8) and the absorption step (S10) is a step that is performed corresponding to the activation state of the printing surface 4 after the state of the printing surface 4 of the printing pad 10 is checked (S7 and S9) before the air blowing step (S8) or the absorption step (S10) is performed.

When printing is performed on the next item to be printed 70 after it is determined in S7 or S9 that the printing surface 4 is in a state appropriate for transferring the ink 40, the flow returns to S1 again. When the production of an item to be printed 70 ends, the flow ends (S11). As described above, the printing apparatus 100 is an apparatus that performs the start process when the printing apparatus 100 is turned on, and that performs the repetition process thereafter to perform printing on a large number of items to be printed 70.

In the case where the printing original plate 50 is formed by the plurality of single color printing original plates 50, for example, the printing may be performed using a plurality of printing apparatuses 100 that correspond to the plurality of single color printing original plates 50. For example, one printing apparatus 100 includes a single color printing original plate 50, and performs printing on the item to be printed 70 using only magenta ink. Thereafter, the printing is performed on the item to be printed 70 using only cyan ink by another printing apparatus 100 including the single color printing original plate 50. Printing can be performed by repeating such operations by a number of times equal to the number of the plurality of single color printing original plates 50.

In the case where the printing apparatus 100 includes a plurality of printing original plate stages 85 and a plurality of ink placement devices 63 corresponding to the plurality of single color printing original plates 50, the printing apparatus 100 repeatedly perform at least the ink placement step, the ink transfer step, and the printing step on one item to be printed 70 by a number of times equal to the number of the plurality of single color printing original plates 50. The printing apparatus 100 may repeatedly perform at least one of the cleaning step, the activation step, the air blowing step, and the absorption step by a number of times equal to the number of the plurality of single color printing original plates 50.

The method for producing the item to be printed 70 with the printing apparatus 100 has been described heretofore. However, the production method is not limited to the above, and each step may be suitably changed and performed.

Figure 15:
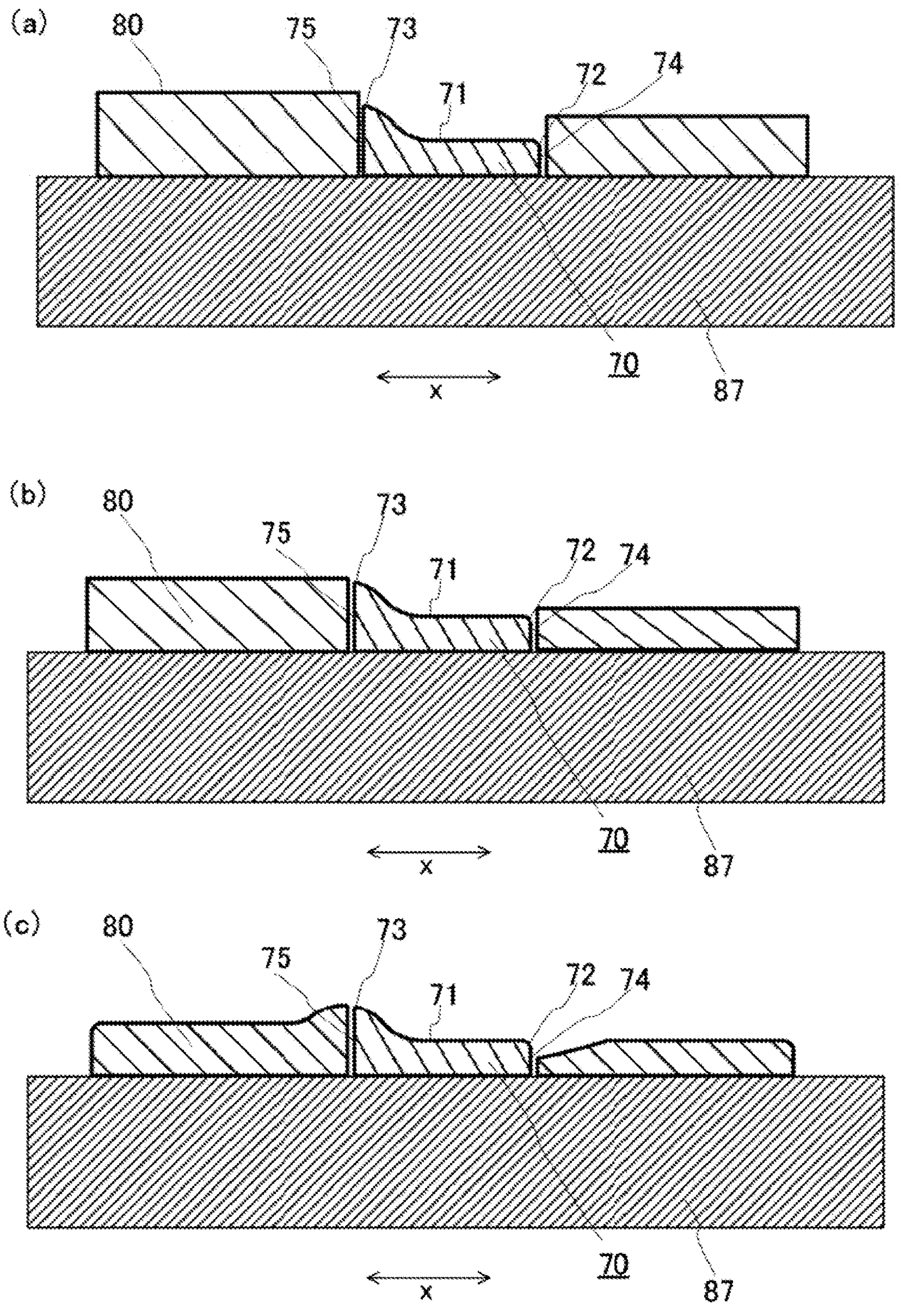
FIG. 15 is a cross-sectional view showing one example of a method for producing the printing tool 80 according to Embodiment 1.

FIG. 15 is a cross-sectional view showing one example of a method for producing the printing tool 80 according to Embodiment 1. First, as shown in FIG. 15 (*a*), the periphery of the item to be printed 70 is enclosed by a flat-plate-like part having a height slightly higher than the highest portion of the item to be printed 70. The upper surface and the inner edges 81 and 82 of the flat-plate-like part are shaved by repeatedly performing printing on the item to be printed 70. The amount of shaving of the part is adjusted by observing the print image transferred to the item to be printed 70. In FIG. 15, there are gaps between the item to be printed 70 and the printing tool 80. However, there may be cases where there is no gap between the item to be printed 70 and the printing tool 80. For example, a configuration may be adopted in which the printing tool 80 is pushed against the item to be printed 70 in the horizontal direction, thus forming no gap between the printing tool 80 and the item to be printed 70. Alternatively, printing may be performed with the item to be printed 70 positioned at a portion close to one side in the printing tool 80. The printing tool 80 is not limited to a printing tool that encloses the periphery of the item to be printed 70 over the entire circumference, and also includes a printing tool that is partially disposed on the periphery of the item to be printed 70.

Embodiment 1 has been described heretofore. However, the Embodiment merely forms one example, and Embodiment and the modifications may be combined together, or may be combined with another known technique. Further, some components may be omitted or changed without departing from the gist of the present disclosure. Specifically, the printing tool 80, the printing apparatus 100, and the printing method described above also include combinations of respective features of respective items shown in the following Appendixes 1 to 15. Such combinations will be described below.

APPENDIX 1

The printing tool 80 disposed at least at a portion of the periphery of the item to be printed 70 in performing printing in which the printing pad 10 is pushed against the item to be printed 70 by being linearly moved in the first direction toward the printing stage 87 to transfer an ink image transferred to the printing surface 4 of the printing pad 10 to the item to be printed 70, the printing tool 80 including the inner edges 81, 82 disposed side by side with the item to be printed 70 in the second direction orthogonal to the first direction, and facing, in the second direction, the peripheral edge portions 74, 75 of the item to be printed 70 that are portions outside the printing range A of the item to be printed 70.

APPENDIX 2

The printing tool 80 according to Appendix 1, wherein the inner edges 81, 82 are located with a gap formed between the inner edge 81 and the item to be printed 70 and between the inner edge 82 and the item to be printed 70 in the second direction.

APPENDIX 3

The printing tool 80 according to Appendix 1 or 2, further including the pad receiving surfaces 83 extending outward from the inner edges 81, 82, wherein assuming at least a portion of the outer edge of the printing range of the item to be printed as a first outer edge, the first outer edge has a tangential angle $\alpha$ of more than 90°, the tangential angle $\alpha$ being formed by a tangent to the surface to be printed at the first outer edge and an imaginary line passing through the center of the item to be printed and being parallel to the first direction, and the inner edges 81, 82 include a first inner edge 82 located side by side with the peripheral edge portion 74 disposed adjacent to the first outer edge.

APPENDIX 4

The printing tool 80 according to Appendix 3, wherein the pad receiving surface 83 disposed adjacent to the first inner edge 82 has an inclined surface having a tangential angle of less than 90° relative to the imaginary line C.

APPENDIX 5

The printing tool 80 according to Appendix 3 or 4, wherein the upper end 82*a* of the first inner edge 82 is located at a position closer to the printing stage 87 than the first outer edge 72 in the first direction.

APPENDIX 6

The printing tool according to any one of Appendixes 1 to 5, further including the pad receiving surfaces 83 extending outward from the inner edges 81, 82, wherein assuming at least a portion of the outer edge of the printing range A of the item to be printed 70 as a second outer edge 73, the second outer edge 73 has a tangential angle $\beta$ of less than 90°, the tangential angle $\beta$ being formed by a tangent to the surface to be printed 77 at the second outer edge 73 and the imaginary line C passing through the center of the item to be printed 70 and being parallel to the first direction, and the inner edges 81, 82 include a second inner edge 81 disposed side by side with the peripheral edge portion 75 disposed adjacent to the second outer edge 73.

APPENDIX 7

The printing tool 80 according to Appendix 6, wherein the upper end 81*a* of the second inner edge is located at a position equivalent to the second outer edge 73 or at a position farther separated from the printing stage 87 than the second outer edge 73 in the first direction.

APPENDIX 8

The printing tool 80 according to Appendix 6 or 7, further including the second pad receiving surface 84 connected to an outer side of the pad receiving surface 83*b* disposed adjacent to the second inner edge 81.

APPENDIX 9

The printing tool 80 according to Appendix 8, wherein the pad receiving surface 83*b* disposed adjacent to the second inner edge has a tangential angle 9 of less than 90° relative to the imaginary line, and the second pad receiving surface 84 has a tangential angle 92 of 90° or more relative to the imaginary line C.

APPENDIX 10

The printing tool 80 according to any one of Appendixes 1 to 9, wherein the printing tool 80 is made of foamed plastic.

APPENDIX 11

The printing apparatus 100 including: the printing tool 80 according to any one of Appendixes 1 to 10; the printing stage 87 to which the printing tool 80 is fixed; and the printing pad 10 configured to be pushed against the printing tool 80 and the item to be printed 70.

APPENDIX 12

A printing method in which the printing pad 10 is pushed against the item to be printed 70 by being linearly moved in the first direction toward the printing stage 87 to transfer an ink image transferred to the printing surface 4 of the printing pad 10 to the item to be printed 70, the printing method including:

placing the printing tool 80 on the printing stage 87,
  the printing tool 80 including
    the inner edges 81, 82 located in such a way as to face the peripheral edge portions 74, 75 of the item to be printed 70, and
    the pad receiving surfaces 83 extending outward from the inner edges 81, 82; and pushing the printing pad 10 against the item to be printed 70 and the printing tool 80, the printing pad 10 being pushed against the printing tool 80 until the printing pad 10 is brought into contact with the pad receiving surfaces 83.

APPENDIX 13

The printing method according to Appendix 12, wherein the pad receiving surface 83 has an inclined surface having a tangential angle of less than 90° relative to the imaginary line C that passes through the center of the surface to be printed 71 of the item to be printed 70 placed and that is parallel to the first direction, and printing is performed in a state in which the peripheral edge portions 74, 75 of the item to be printed 70 are disposed side by side with the inner edge 81 in the second directions X, Y orthogonal to the first direction Z.

APPENDIX 14

The printing method according to Appendix 13, wherein the printing tool 80 further includes the second pad receiving surface 84 connected to the outer side of the pad receiving surface 83, and the printing pad 10 is pushed against the printing tool 80 until the printing pad 10 is brought into contact with the second pad receiving surface 84.

APPENDIX 15

The printing method according to Appendix 14, wherein the second pad receiving surface 84 has a tangential angle θ2 of 90° or more relative to the imaginary line C.

REFERENCE SIGNS LIST

1: inner layer, 2: outer layer, 4: printing surface, 5: base, 6: apex, 7: support part, 10: printing pad, 11: vertically moving device, 12: horizontally moving device, 20: controller, 20*a*: arithmetic unit, 20*b*: storage device, 21: pad control unit, 22: air sending unit, 23: air blowing unit, 24: activation unit, 25: ink placement unit, 26: temperature control unit, 28: temperature sensor, 40: ink, 50: (single color) printing original plate, 51: placement surface, 57: ink-phobic region, 58: ink-philic region, 60: cleaning device, 61: activation device, 62: air blowing device, 63: ink placement device, 64: ink holding unit, 65: rotary shaft, 66: blower, 66A: blower, 67: heater, 68: temperature sensor, 69: acceleration sensor, 70: item to be printed, 70*a*: rounded corner portion, 70*b*: protruding portion, 71: surface to be printed, 72: (first) outer edge, 73: (second) outer edge, 74: peripheral edge portion, 75: peripheral edge portion, 76: surface to be printed, 77: surface to be printed, 80: printing tool, 81: (second) inner edge, 81*a*: upper end, 82: (first) inner edge, 82*a*: upper end, 83: pad receiving surface, 83*a*: curved surface, 83*b*: pad receiving surface, 84: second pad receiving surface, 84*a*: apex, 85: printing original plate stage, 86: surface treatment stage, 87: printing stage, 100: printing apparatus, A: printing range, C: imaginary line, G: gap, R: corner, T1: tangent, T2: tangent, X: second direction, Y: second direction, Z: first direction, α: (tangential) angle, β: (tangential) angle, θ: tangential angle, θ2: tangential angle.

The invention claimed is:

1. A printing method in which a printing pad, having a printing surface to which an ink image has been transferred, is pushed against an item to be printed by being linearly moved in a first direction toward a printing stage to transfer the ink image to the item to be printed, the printing method comprising:

placing a printing tool and the item to be printed on the printing stage, the printing tool including an inner edge; and a pad receiving surface extending outward from the inner edge;

wherein the placing of the printing tool and the item to be printed are performed such that the inner edge faces a peripheral edge portion of the item to be printed; and pushing the printing pad against the item to be printed and the printing tool, the printing pad being pushed against the printing tool until the printing pad is brought into contact with the pad receiving surface, wherein the pad receiving surface has an inclined surface having a tangential angle of less than 90° relative to a portion of an imaginary line, that passes through a center of a surface to be printed of the item to be printed and that is parallel to the first direction, that is above the item to be printed, such that the inclined surface slopes upwardly away from the item to be printed, and printing is performed in a state in which the peripheral edge portion of the item to be printed is disposed side by side with the inner edge in a second direction orthogonal to the first direction.

2. The printing method of claim 1, wherein the printing tool further includes a second pad receiving surface connected to an outer side of the pad receiving surface, and the printing pad is pushed against the printing tool until the printing pad is brought into contact with the second pad receiving surface.

3. The printing method of claim 2, wherein the second pad receiving surface has a tangential angle of 90° or more relative to the portion of the imaginary line that is above the item to be printed.

* * * * *